(12) United States Patent
Miyamae et al.

(10) Patent No.: US 6,643,067 B2
(45) Date of Patent: Nov. 4, 2003

(54) ELECTRO-OPTICAL DEVICE AND ELECTRONIC APPARATUS

(75) Inventors: Akira Miyamae, Suwa (JP); Kimio Nagasaka, Suwa (JP); Osamu Okumura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 181 days.

(21) Appl. No.: 09/987,713

(22) Filed: Nov. 15, 2001

(65) Prior Publication Data

US 2002/0093742 A1 Jul. 18, 2002

(30) Foreign Application Priority Data

Nov. 22, 2000 (JP) .................................... 2000-356687
Feb. 15, 2001 (JP) .................................... 2001-038505
Mar. 27, 2001 (JP) .................................... 2001-091252

(51) Int. Cl.⁷ ............................. G02B 27/10; G02F 1/03; G02F 1/1335; F21V 7/04
(52) U.S. Cl. ....................... 359/619; 359/626; 359/245; 362/31; 349/62; 349/65; 349/73
(58) Field of Search ................................ 359/619, 625, 359/626, 627, 253, 254, 263, 245; 362/29, 30, 31; 349/62, 63, 65, 95, 73

(56) References Cited

U.S. PATENT DOCUMENTS

| | | | | |
|---|---|---|---|---|
| 4,509,824 A | * | 4/1985 | Yamasaki et al. | 359/619 |
| 5,359,454 A | * | 10/1994 | Steenblik et al. | 359/619 |
| 5,914,760 A | * | 6/1999 | Daiku | 349/65 |
| 6,204,967 B1 | * | 3/2001 | Morishima et al. | 359/462 |
| 6,215,594 B1 | * | 4/2001 | Inoguchi et al. | 359/619 |

FOREIGN PATENT DOCUMENTS

| | | |
|---|---|---|
| JP | A-8-190095 | 7/1996 |
| JP | A-9-167513 | 6/1997 |
| JP | A-11-271749 | 10/1999 |

* cited by examiner

*Primary Examiner*—Loha Ben
(74) *Attorney, Agent, or Firm*—Oliff & Berridge, PLC

(57) ABSTRACT

An electro-optical device which includes a plurality of point light sources, a micro-lens array in which a plurality of micro-lenses are disposed, and a light modulation device including a plurality of light-transmissive windows. The electro-optical device is constructed so that, by the micro-lens array, light from the plurality of point light sources is focused at the light-transmissive windows.

29 Claims, 19 Drawing Sheets

[FIG. 1]
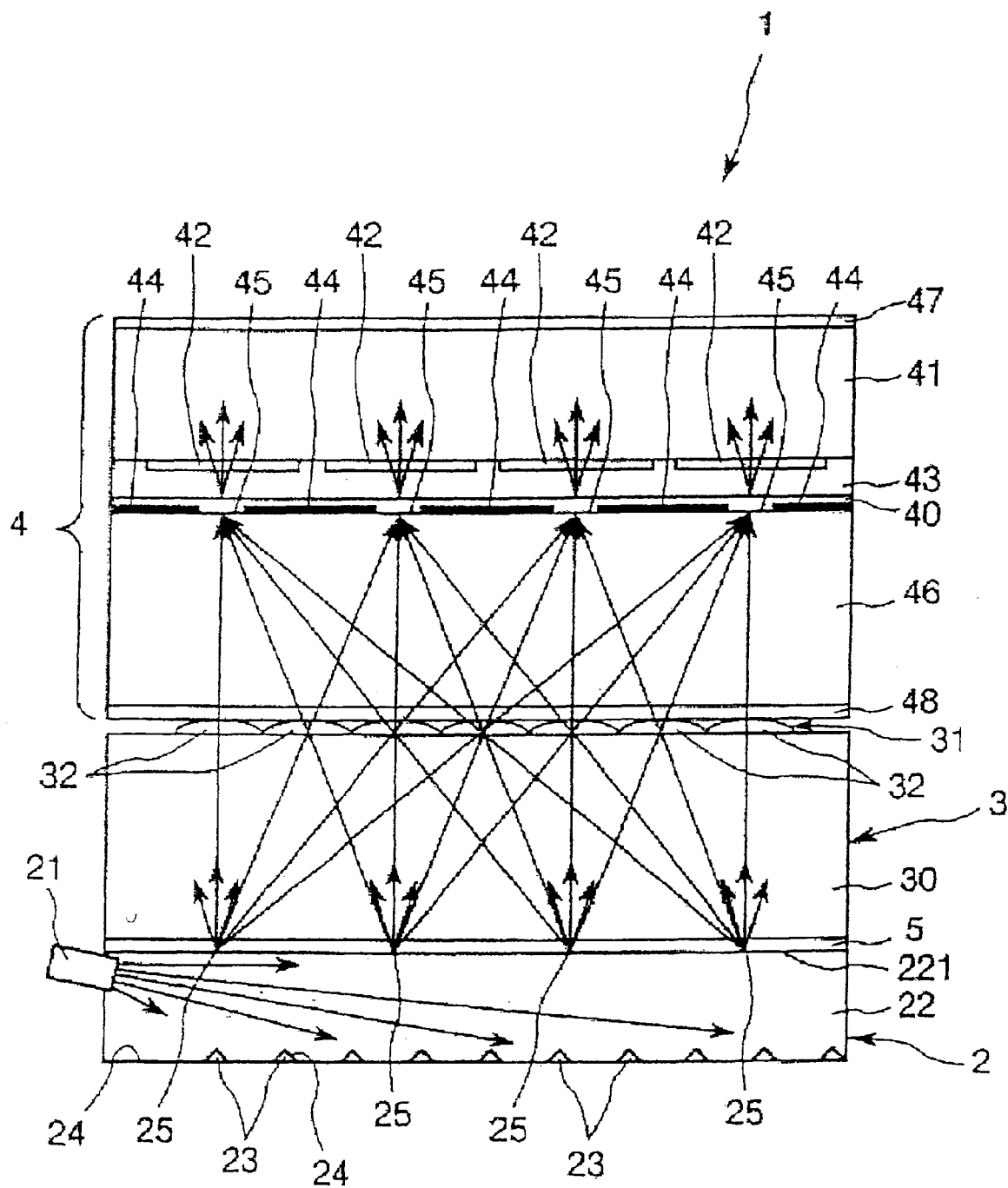

[FIG. 2]
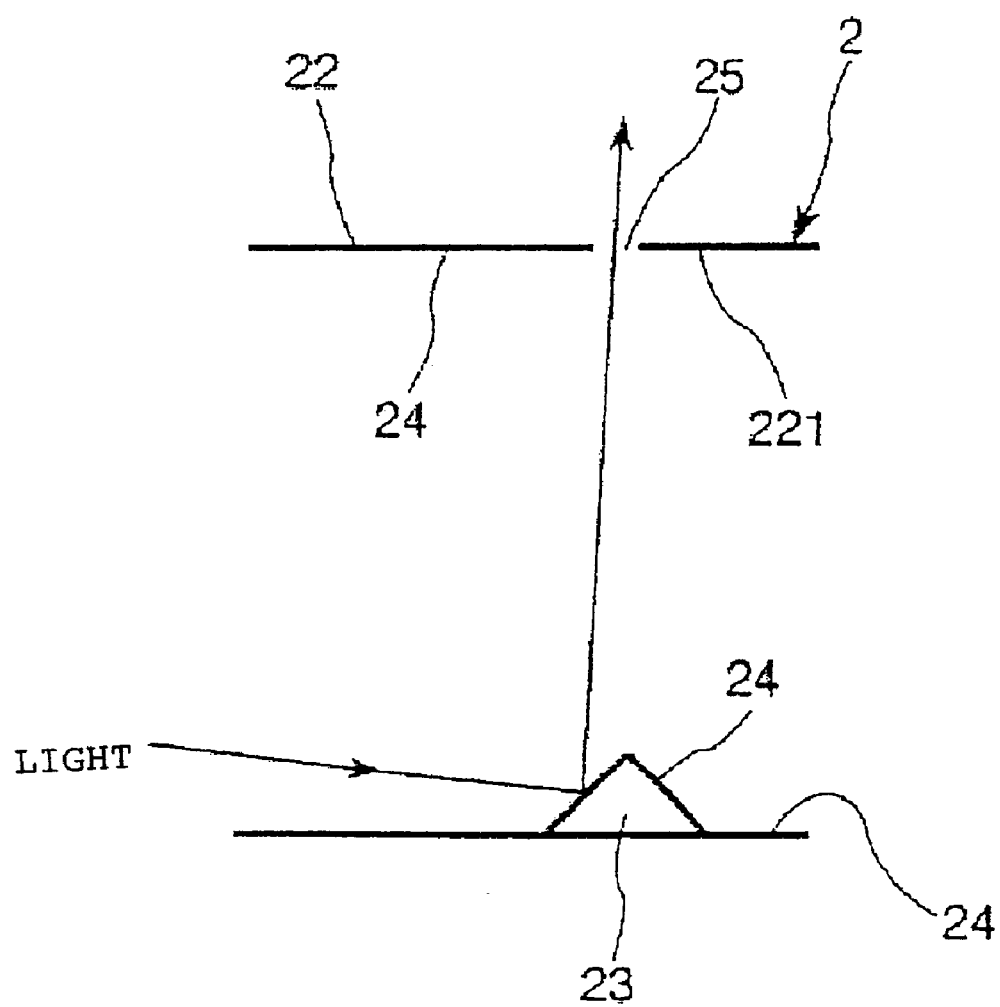

[FIG. 3]
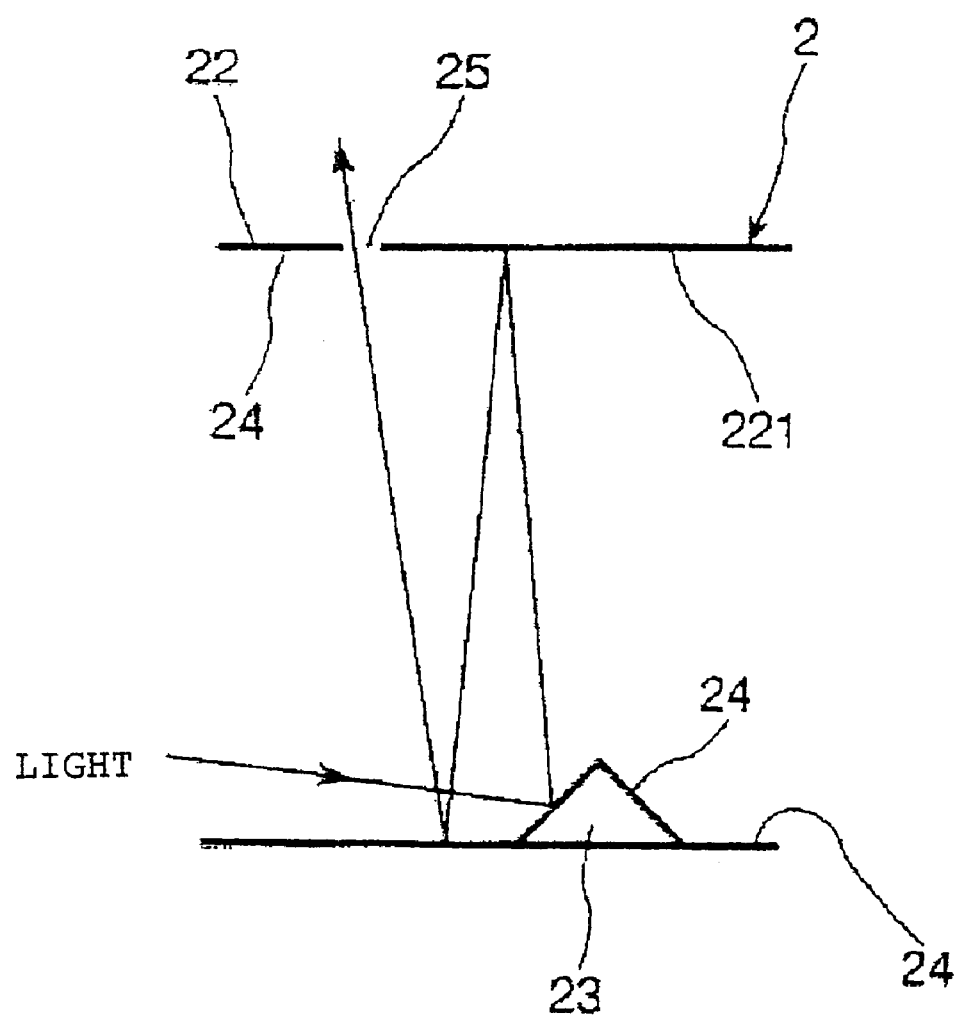

[FIG. 4]
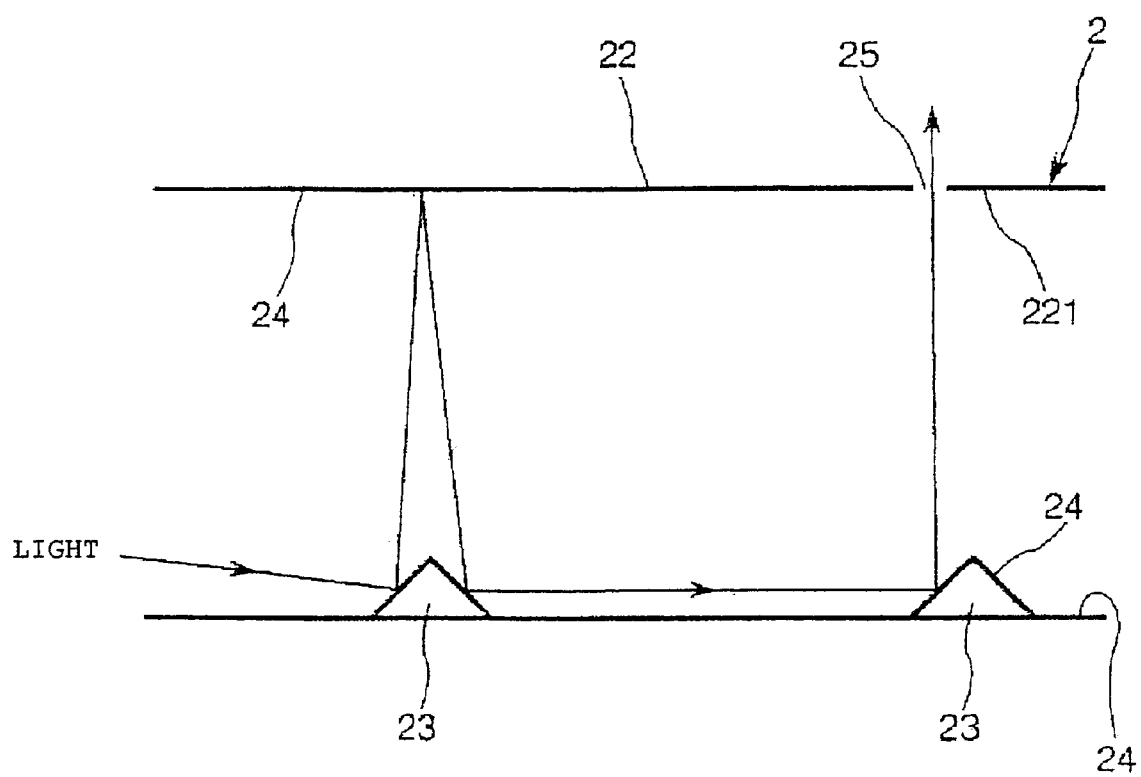

[FIG. 5]
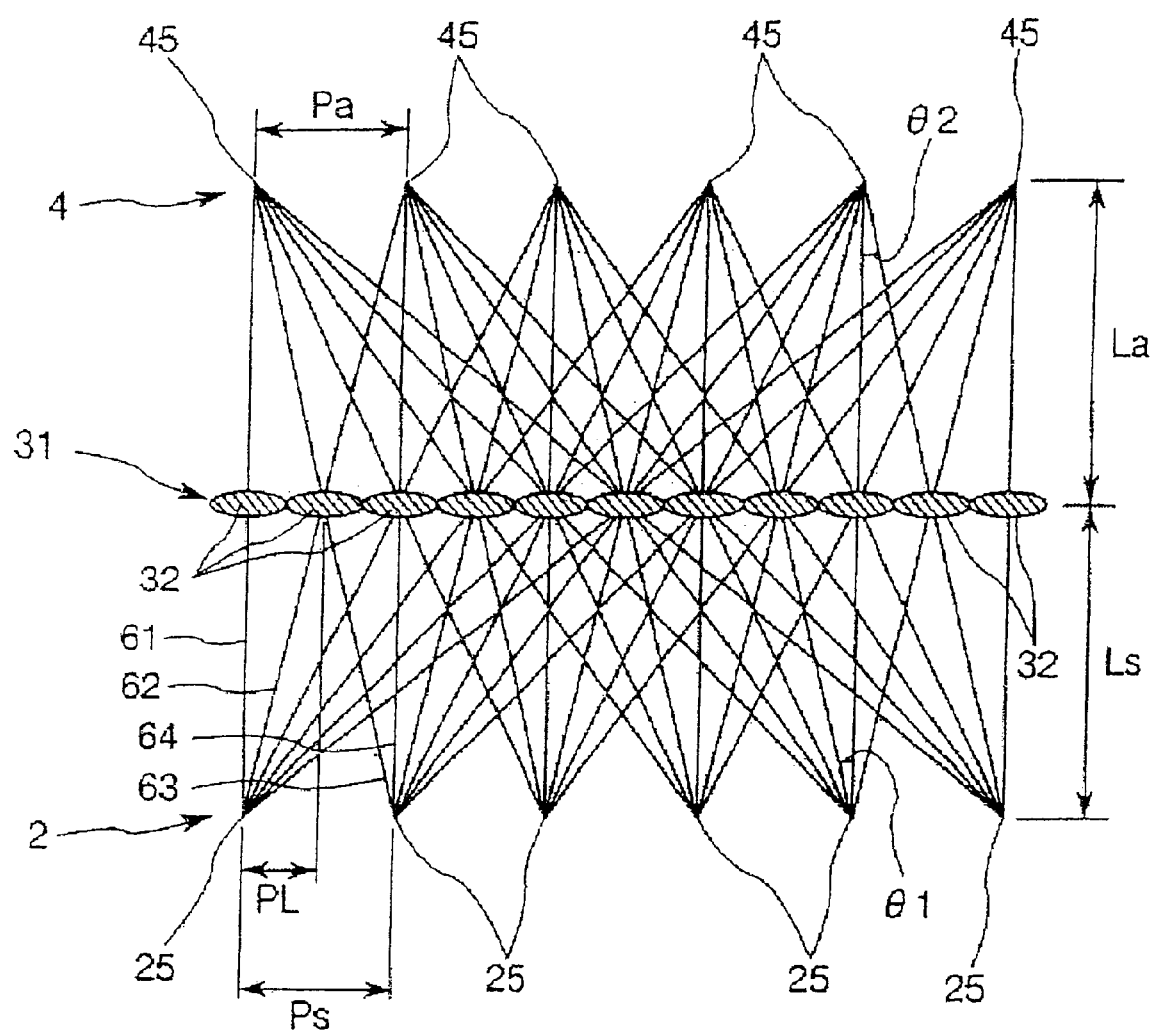

[FIG. 6]
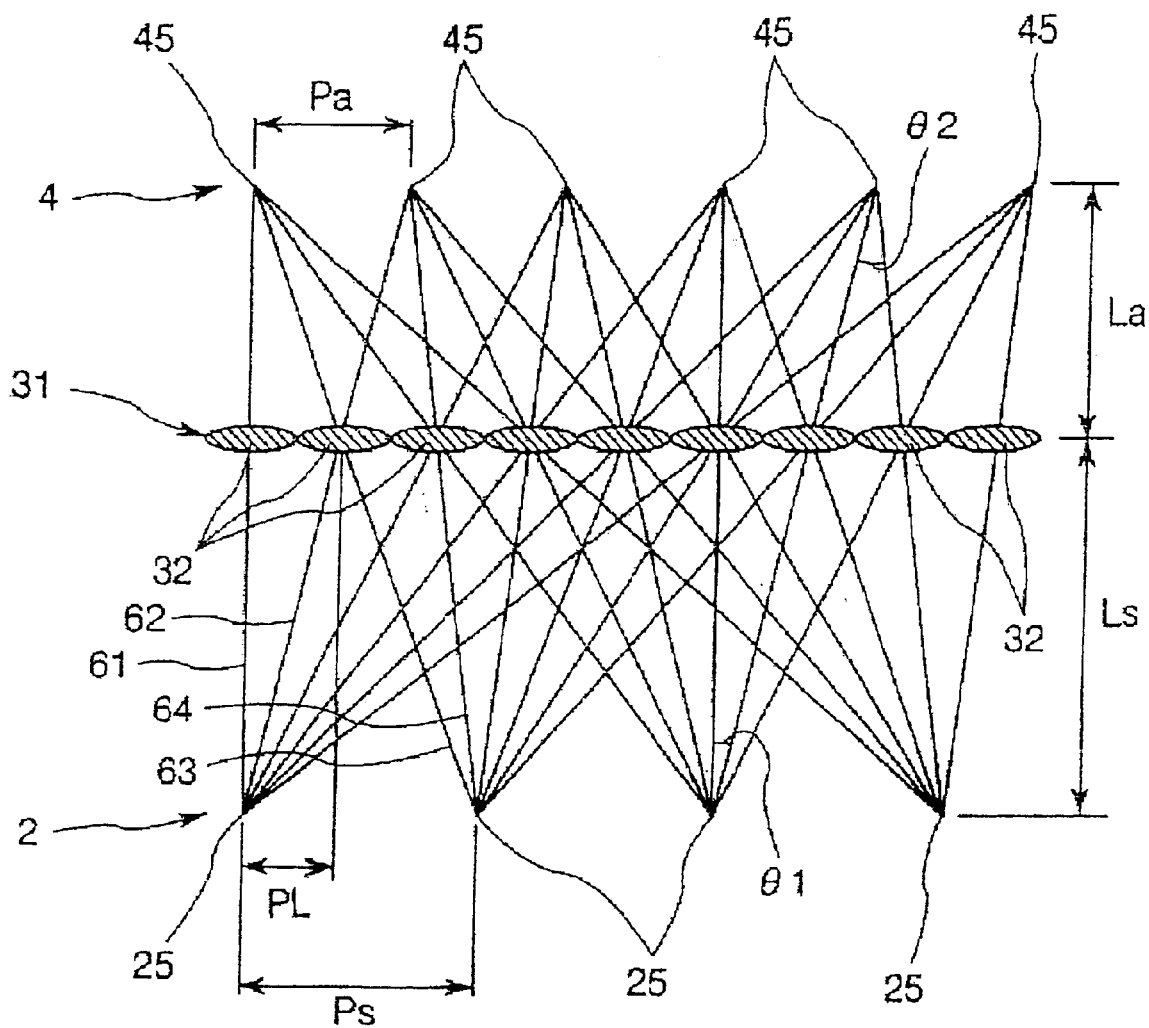

[FIG. 7]
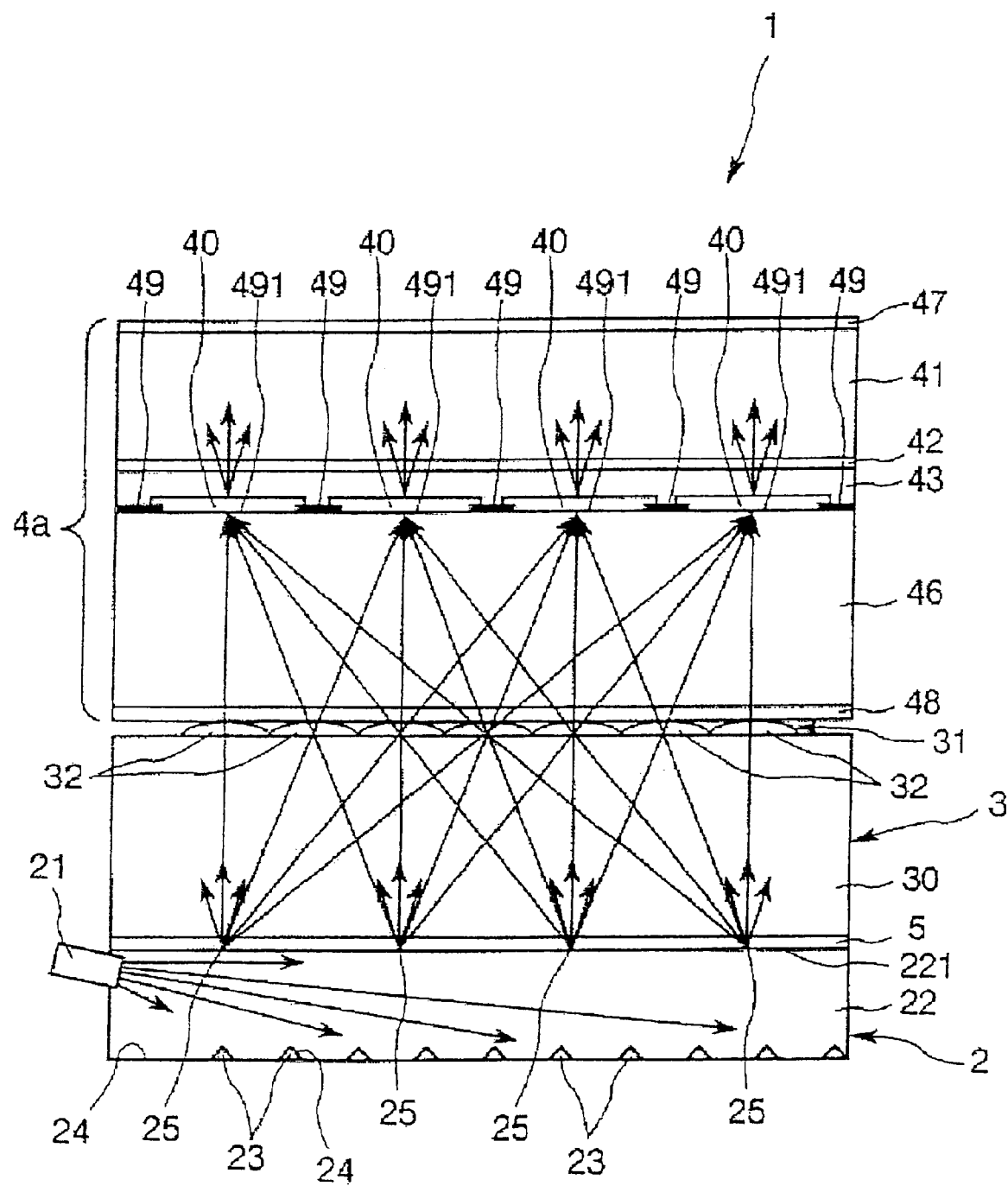

[FIG. 8]
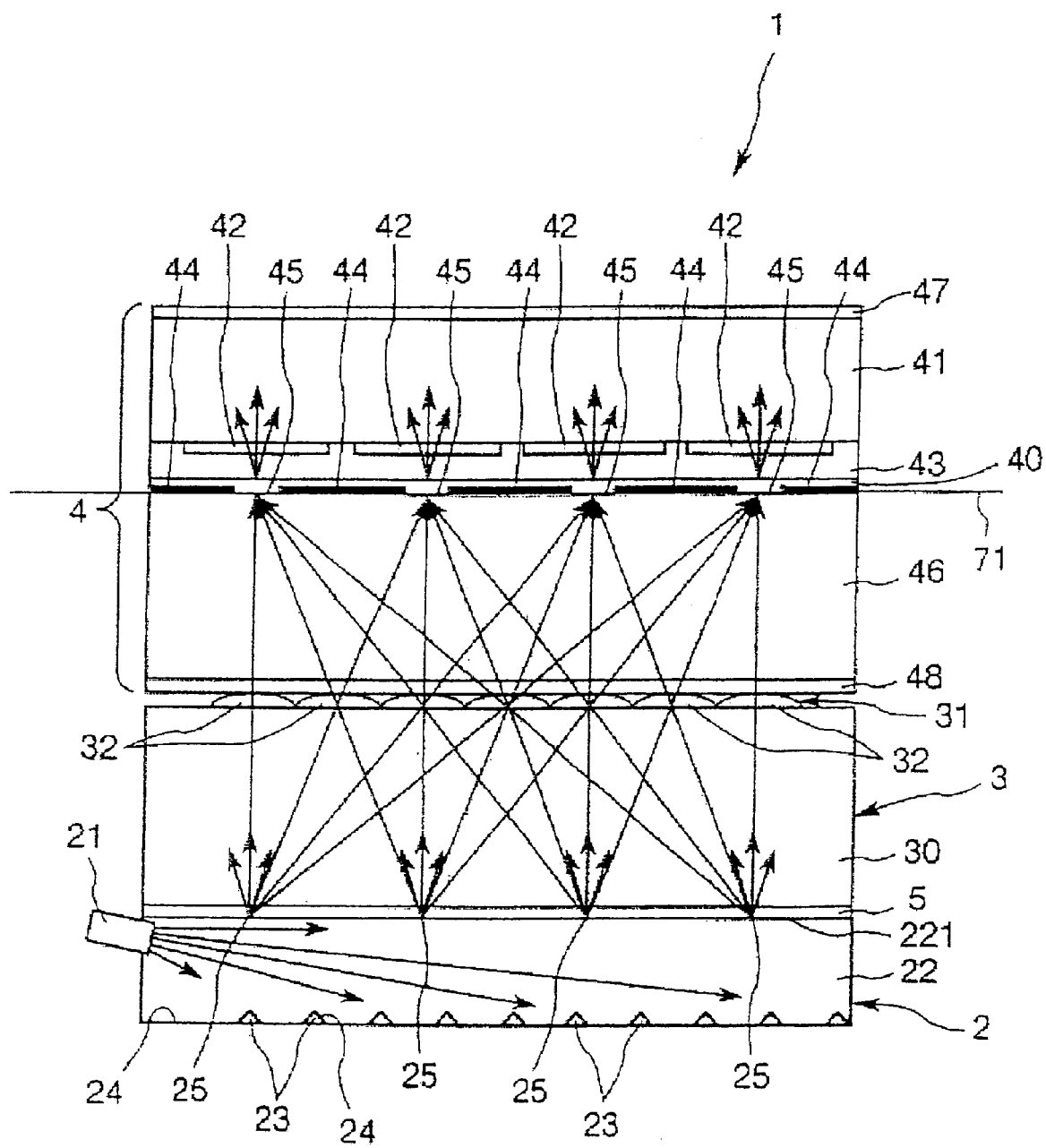

[FIG. 9]
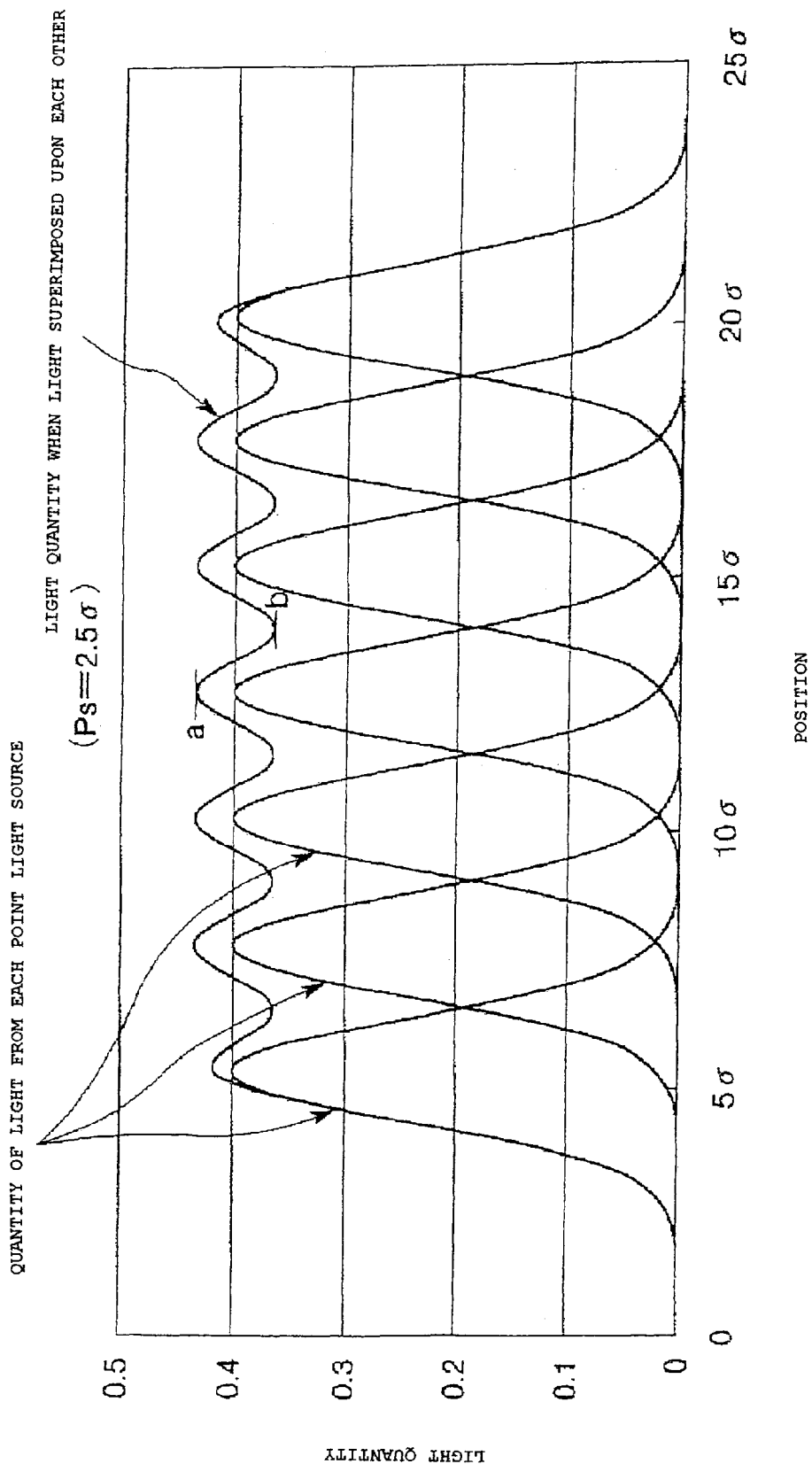

[FIG. 10]
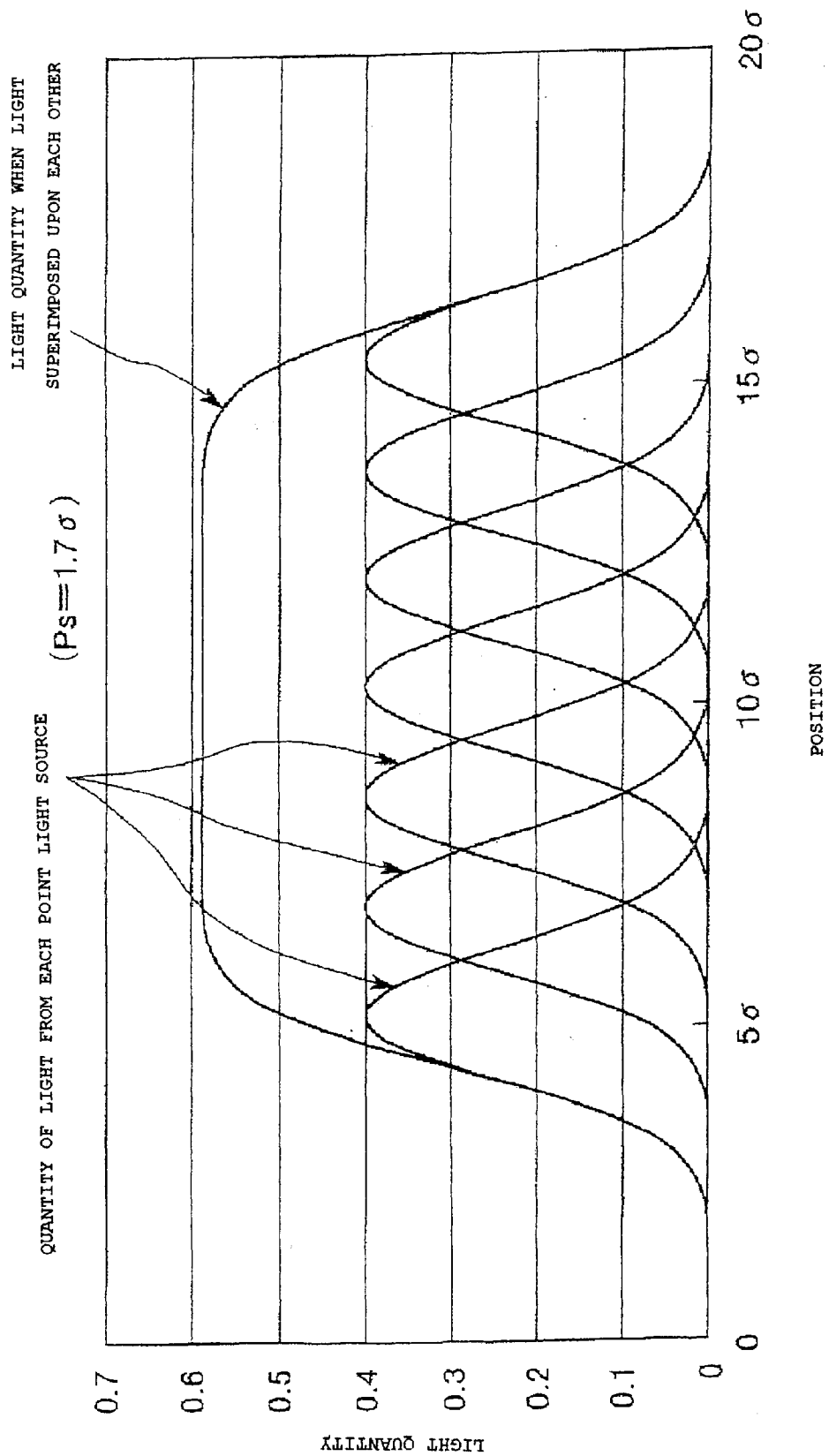

[FIG. 11]
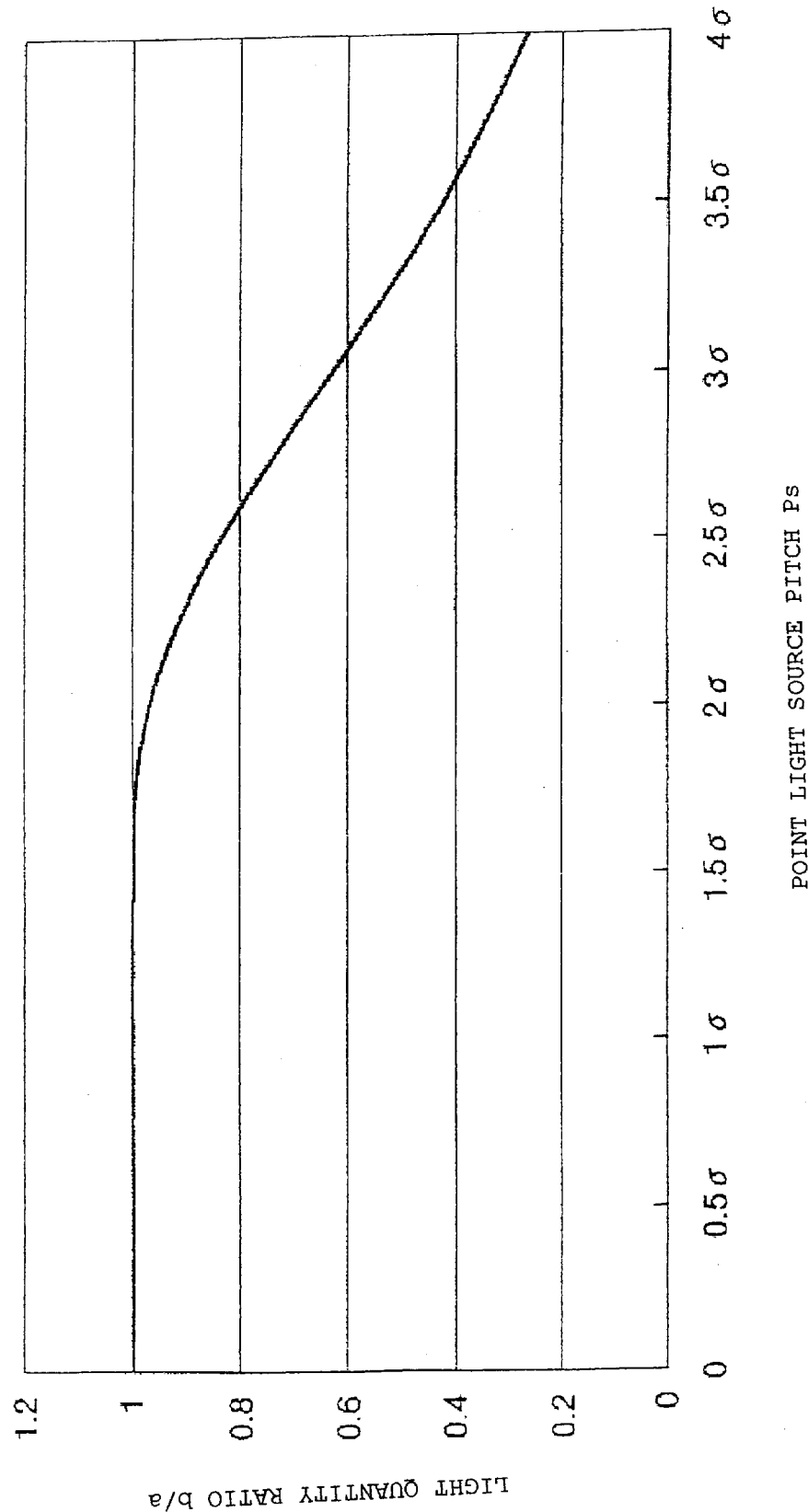

[FIG. 12]
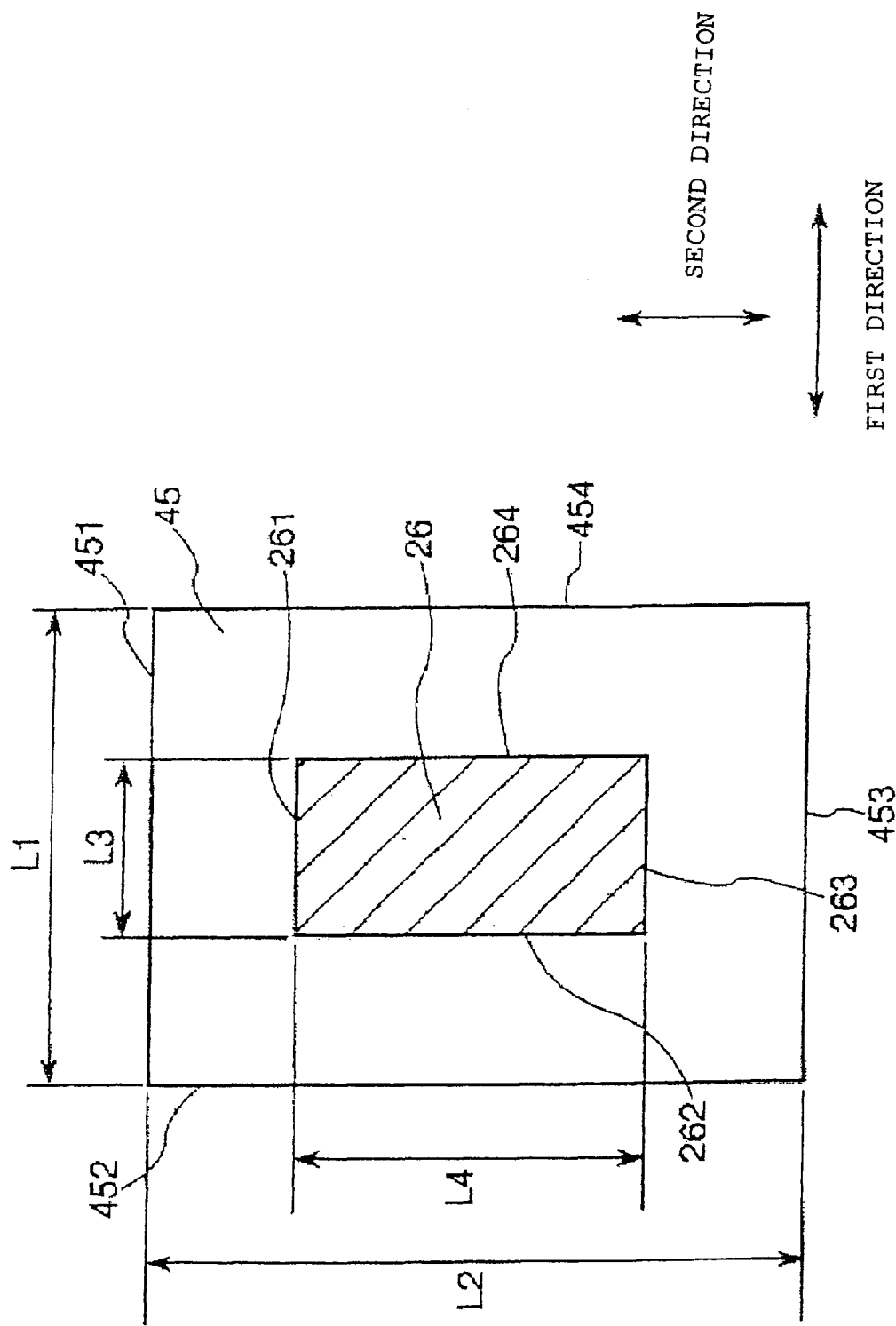

[FIG. 13]
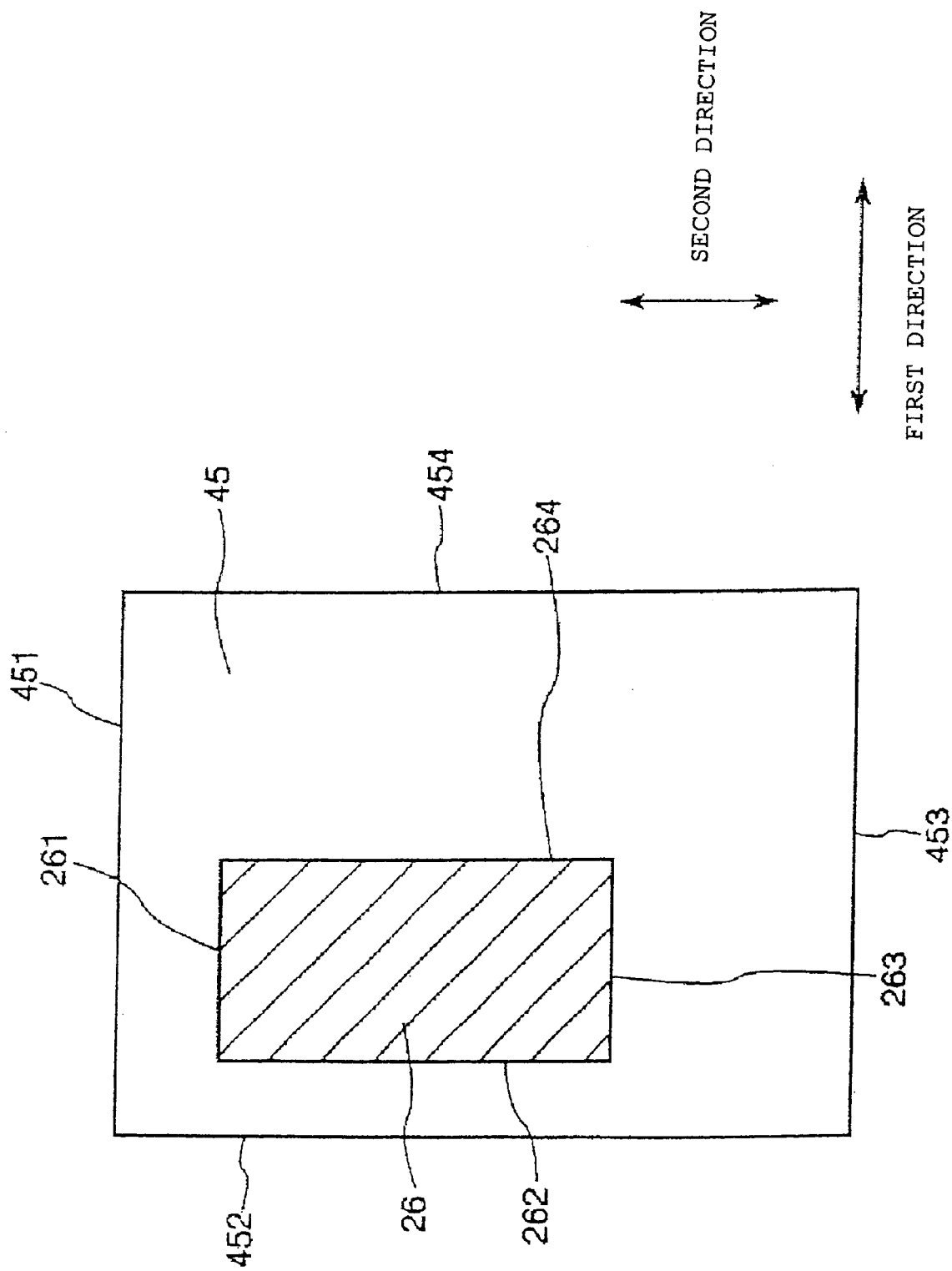

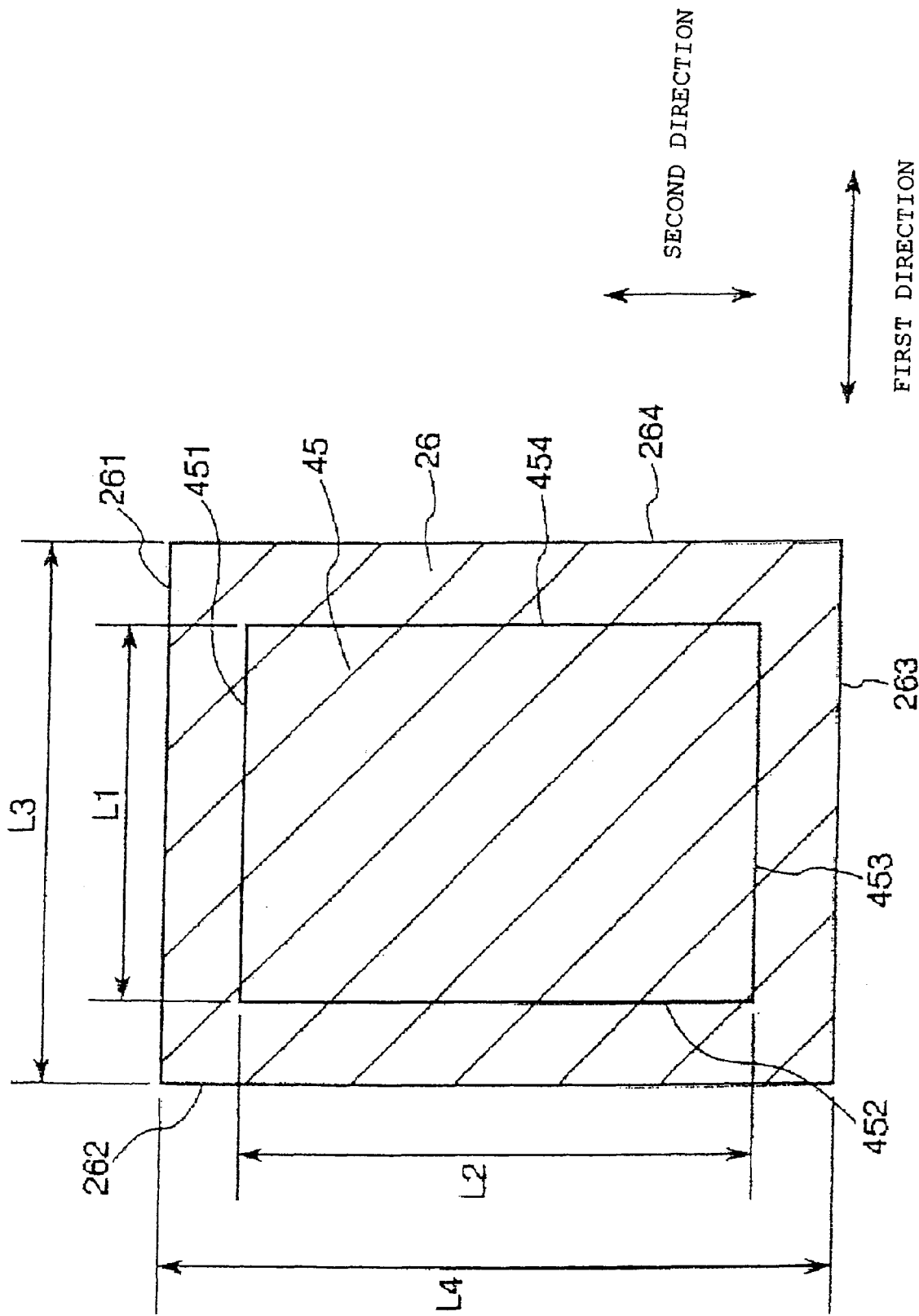
[FIG. 14]

[FIG. 15]
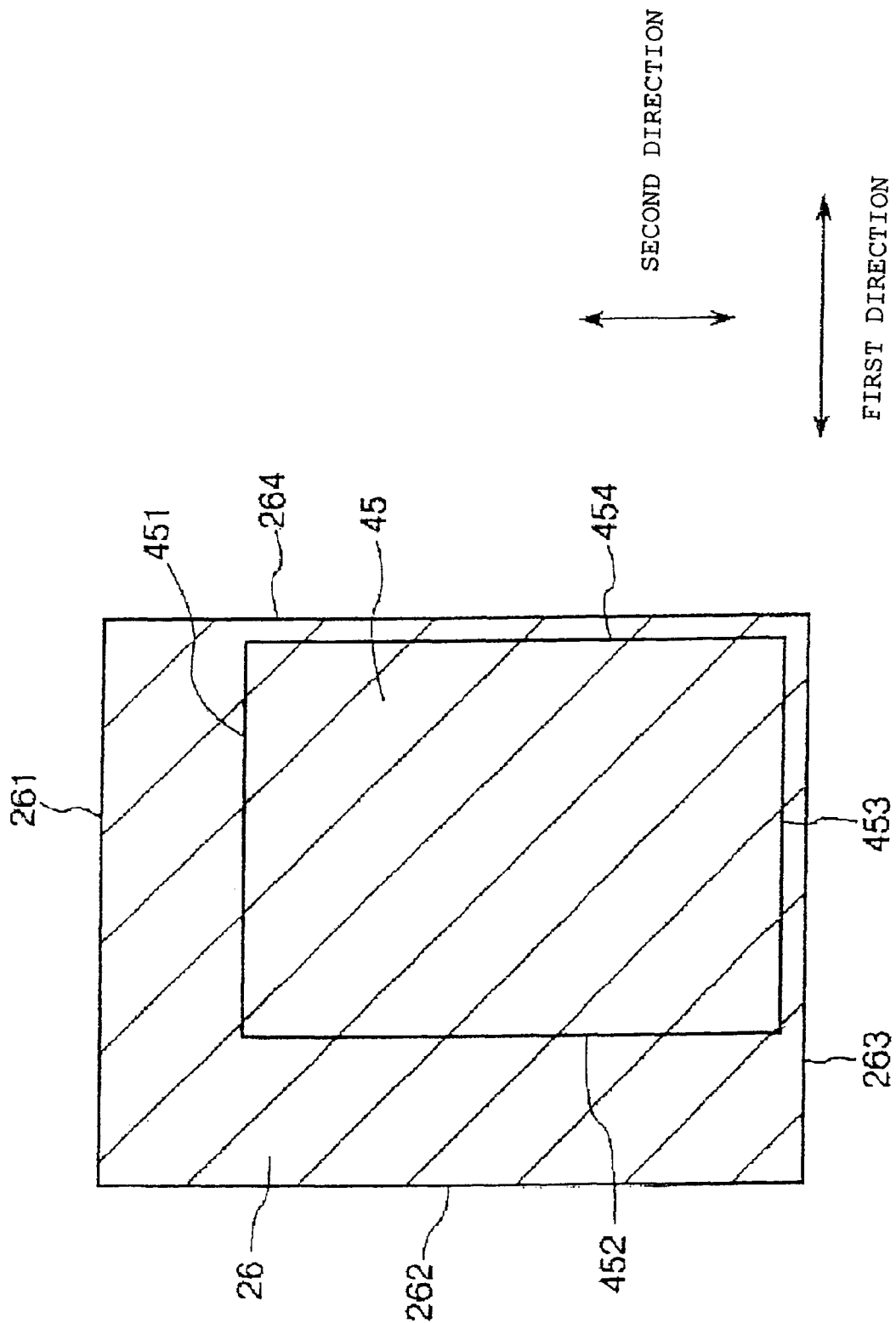

[FIG. 16]
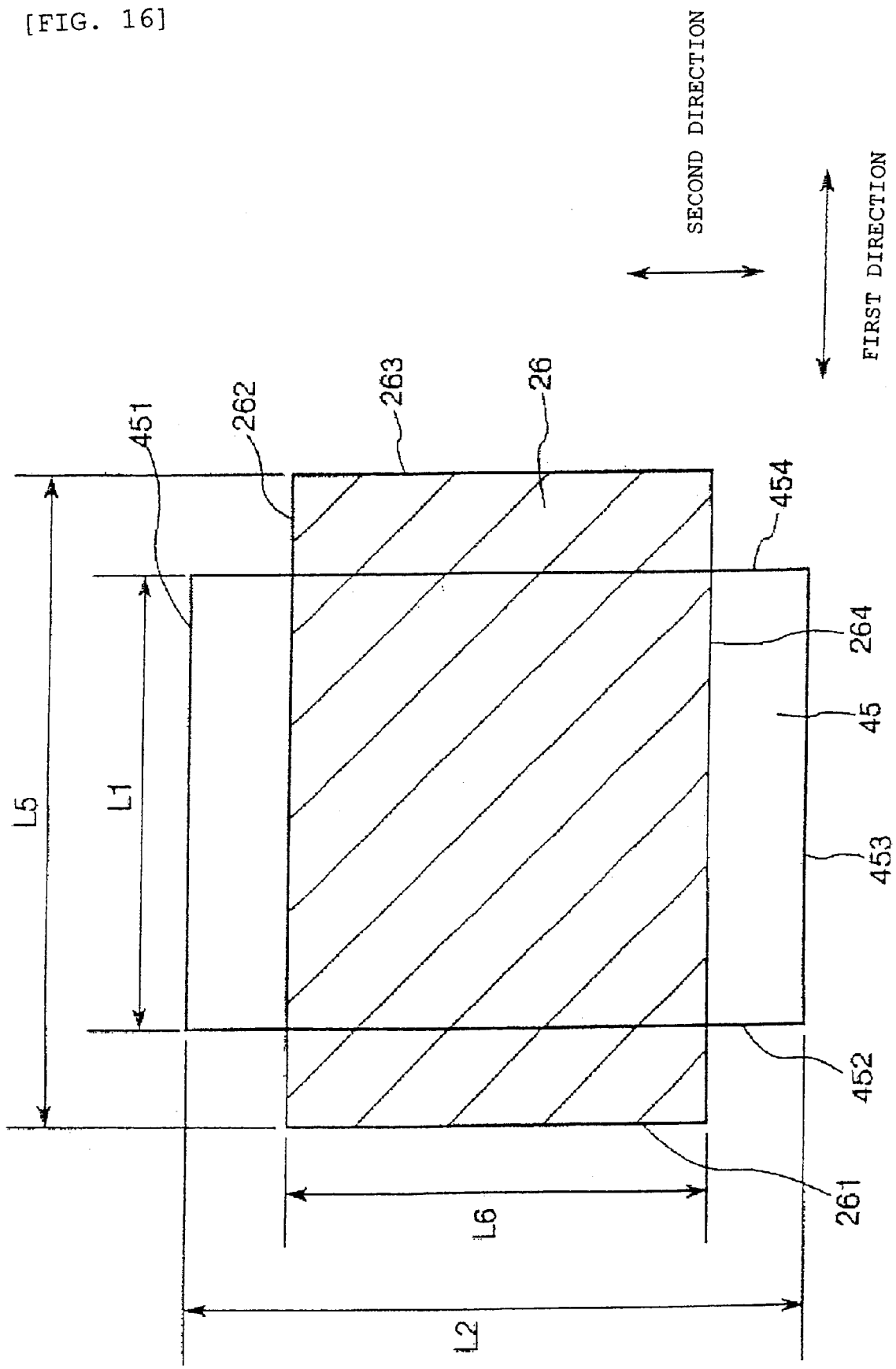

[FIG. 17]
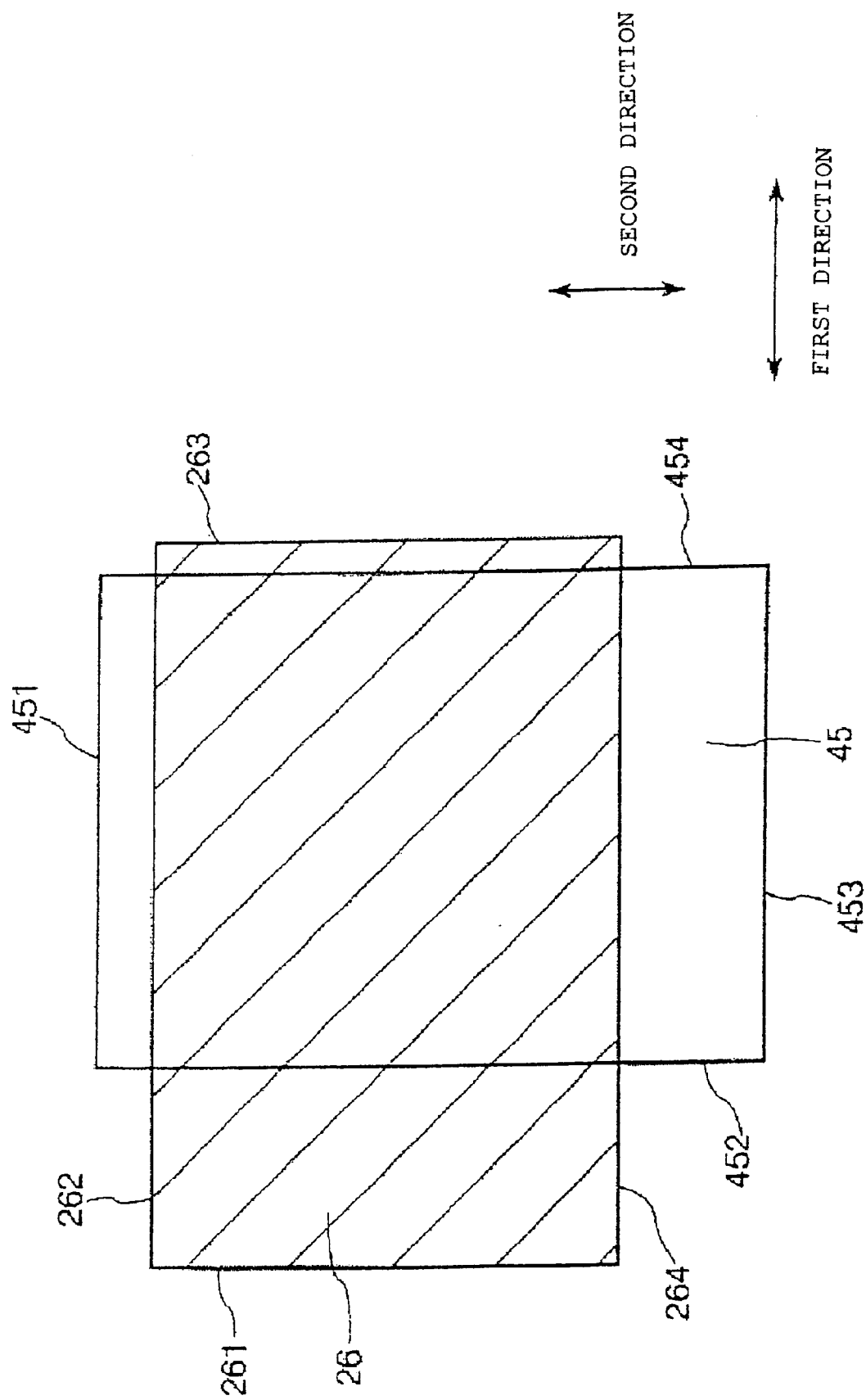

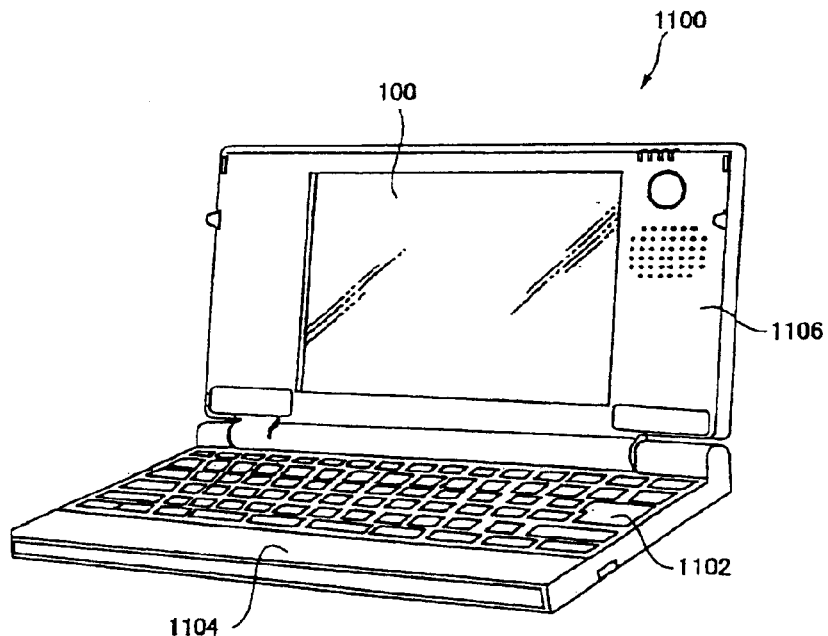
[FIG. 18]
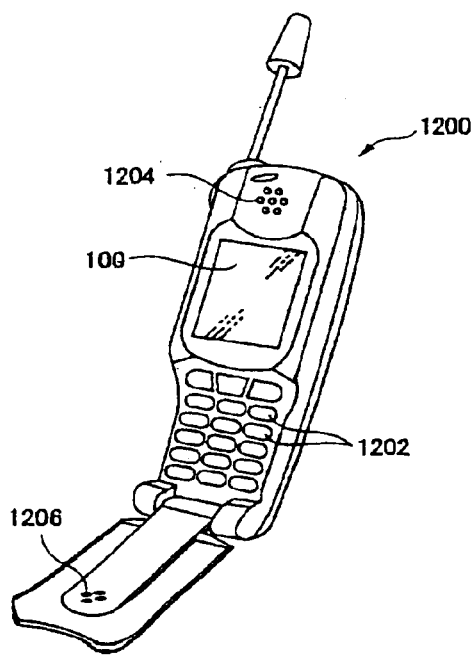
[FIG. 19]

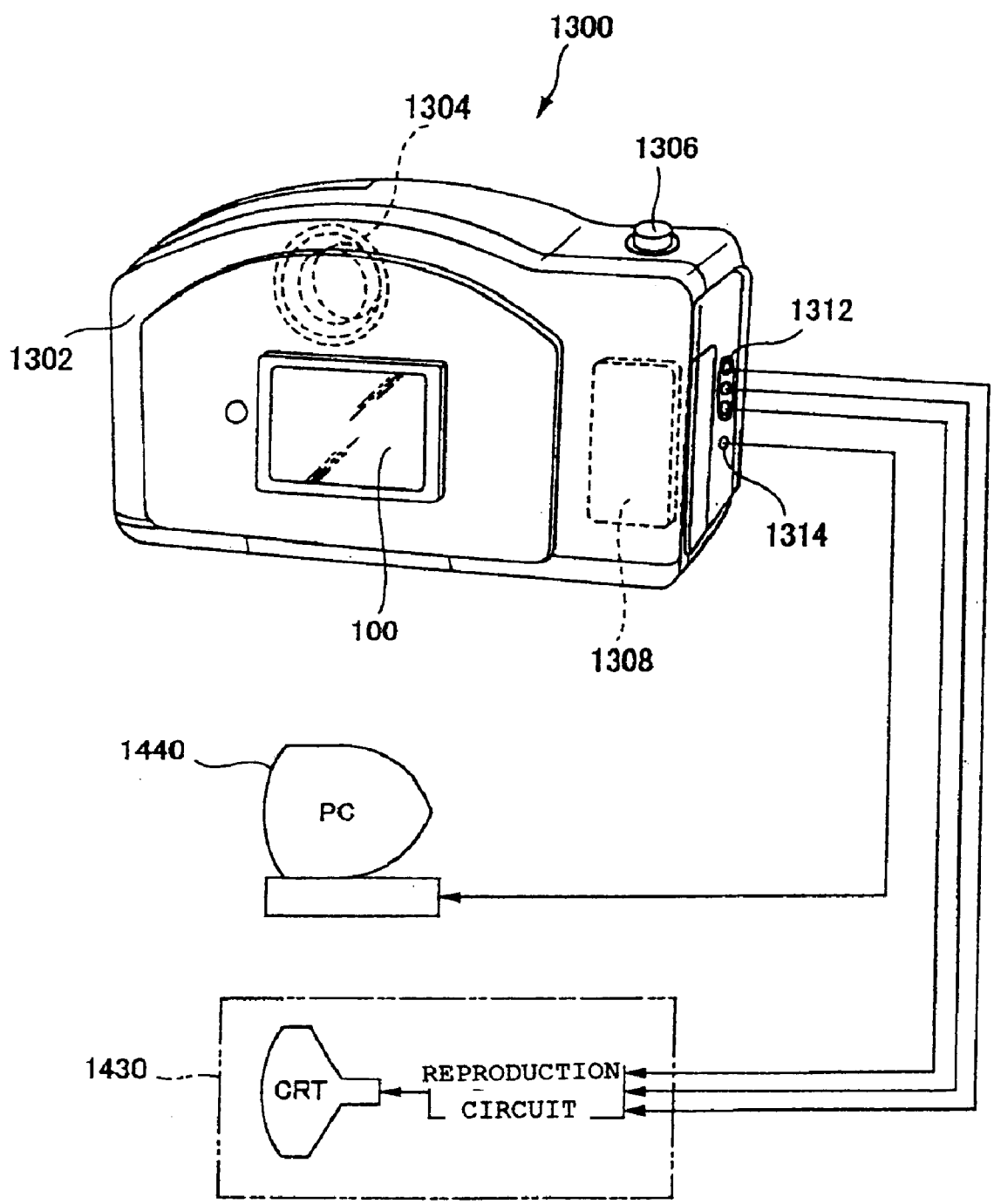
[FIG. 20]

ELECTRO-OPTICAL DEVICE AND ELECTRONIC APPARATUS

BACKGROUND OF THE INVENTION

1. Field of Invention

The present invention relates to an electro-optical device and an electronic apparatus using the electro-optical device.

2. Description of Related Art

There is a demand that electronic apparatuses, such as personal computers and portable devices, be smaller and thinner. It is very disadvantageous to use a large-scale light source having high directivity as a light source of a display device (electro-optical device) of such electronic apparatuses. Thus, such a light source is not actually used.

Therefore, for example, in a liquid crystal display device, a method is used in which light from a light source is guided to the back surface of a liquid crystal panel by a light guide member in order to illuminate the liquid crystal panel from the back surface thereof using, for example, a reflector plate, a diffusing plate, or a prism sheet.

However, related art display devices have the following problems.

For example, when the display device includes a transmissive liquid crystal panel or a transflective liquid crystal panel and a backlight (light source), a portion which does not pass the light is formed at, for example, a reflector plate (reflector electrode) or a drive circuit of the liquid crystal panel. Light which has returned after being emitted from the light source and reflected at the portion that does not pass light is absorbed by any one of the members, so that the light cannot be used. For this reason, the efficiency with which the light from the light source is used is low.

By using a prism sheet, the directivity of light can be increased. However, even if the directivity is increased, it is in a range of the order of ±30° at most. Therefore, even if a micro-lens array is used, the light from the light source cannot be efficiently gathered at a light-transmissive window of the liquid crystal panel.

In particular, a transflective liquid crystal panel may be illuminated by light that passes a pin-hole shaped opening (light-transmissive window) formed in the reflector plate. In this case, the ratio of light reflected by the reflector plate with respect to incident outside light (hereinafter "the reflection ratio") and the ratio of light that passes through the opening with respect to light from the light source (hereinafter "the transmittance ratio") are each determined by the ratio between the area of the reflector plate and the area of its opening. Therefore, when the area of the opening is made to be large in order to increase the transmittance ratio, the area of the reflector plate becomes small, so that the reflectance ratio becomes small. On the contrary, when the area of the opening is made to be small to increase the reflectance ratio, the transmittance ratio becomes small (that is, they are in a trade-off relationship).

In this way, in related art display devices (electro-optical devices), light from the light source cannot be efficiently gathered at the light-transmissive window, so that the efficiency with which the light emitted from the light source is used is low.

SUMMARY OF THE INVENTION

An object of the present invention is to provide an electro-optical device which uses light emitted from a light source with high efficiency.

According to the present invention, the following exemplary electro-optical devices of (1) to (3) are described below.

(1) An electro-optical device includes a plurality of point light sources, a micro-lens array in which a plurality of micro-lenses are disposed, and a light modulation device including a plurality of light-transmissive windows. The electro-optical device is constructed so that light from the plurality of point light sources is focused at the light-transmissive windows by the micro-lens array.

(2) An electro-optical device includes a plurality of point light sources, a micro-lens array in which a plurality of micro-lenses are disposed, and a light modulation device including a plurality of light-transmissive windows. The point light sources, the micro-lenses of the micro-lens array, and the light-transmissive windows are disposed so that light from the plurality of point light sources is focused at the light-transmissive windows by the micro-lens array.

(3) An electro-optical device includes a plurality of point light sources, a micro-lens array in which a plurality of micro-lenses are disposed, and a light modulation device including a plurality of light-transmissive windows. The point light sources, the micro-lenses of the micro-lens array, and the light-transmissive windows are disposed so that the micro-lenses of the micro-lens array cause light from the plurality of point light sources to be focused at the plurality of light-transmissive windows.

Regarding each of the exemplary embodiments (1) to (3) of the invention, the following embodiments are, preferably, provided. However, the present invention is not limited to these embodiments.

(4) In an electro-optical device according to any one of the exemplary embodiments (1) to (3), where a pitch between the point light sources is Ps, a pitch between the light-transmissive windows is Pa, a pitch between the micro-lenses of the micro-lens array is PL, an optical distance between the point light sources and the micro-lens array is Ls, and an optical distance between the micro-lens array and the light-transmissive windows is La, the electro-optical device is constructed so that the following conditional expressions are satisfied:

$PL=\{Ps \cdot Pa/(Ps+Pa)\} \cdot n$ (where $n$ is a natural number)

$La/Ls=Pa/Ps$.

(5) In an electro-optical device according to any one of the exemplary embodiments (1) to (3), where a pitch between the point light sources is Ps, a pitch between the light-transmissive windows is Pa, a pitch between the micro-lenses of the micro-lens array is PL, an optical distance between the point light sources and the micro-lens array is Ls, and an optical distance between the micro-lens array and the light-transmissive windows is La, the electro-optical device is constructed so that the following conditional expressions are satisfied:

$PL=\{Ps \cdot Pa/(Ps+Pa)\} \cdot n$ (where $n$ is a natural number other than 2)

$La/Ls=Pa/Ps$.

(6) In an electro-optical device according to the aforementioned exemplary embodiments (4) or (5), the pitch Ps between the point light sources is greater than the pitch Pa between the light-transmissive windows.

(7) In an electro-optical device according to the aforementioned exemplary embodiments (4) or (5), the pitch Ps between the point light sources is equal to the pitch Pa between the light-transmissive windows.

(8) In an electro-optical device according to any one of the aforementioned exemplary embodiments (1) to (7), the pitch between the point light sources is, in a state where the micro-lens array is not provided, set so that a quantity of the light from the plurality of point light sources in a plane which passes through each light-transmissive window becomes substantially uniform.

(9) In an electro-optical device according to any one of the aforementioned exemplary embodiments (1) to (7), in a state where the micro-lens array is not provided, where a standard deviation in a distribution of a quantity of the light from each point light source in a plane which passes through each light-transmissive window is σ, the pitch between the point light sources is equal to or less than 2.3σ.

(10) In an electro-optical device according to any one of the aforementioned exemplary embodiments (1) to (7), in a state where the micro-lens array is not provided, where a maximum value and a minimum value of a quantity of the light from the plurality of point light sources in a plane which passes through each light-transmissive window are a and b, respectively, the pitch between the point light sources is set so that a light quantity ratio b/a is equal to or greater than 0.9.

(11) In an electro-optical device according to any one of the aforementioned exemplary embodiments (1) to (10), the electro-optical device is constructed so that the light from the point light sources is used to form an image in a/the plane which passes through each light-transmissive window, and so that an area of a portion where an image of each point light source in the plane and each light-transmissive window overlap does not change to the extent possible even when the image of each point light source and each light-transmissive window are displaced relative to each other.

(12) An electro-optical device according to the aforementioned exemplary embodiment (11), the electro-optical device is constructed so that the area of each portion where the image of each point light source in the plane and each light-transmissive window overlap does not change to the extent possible even when the image of each point source and each light-transmissive window are displaced relative to each other in a first direction and/or a second direction perpendicular to the first direction in the plane.

(13) In an electro-optical device according to any one of the aforementioned exemplary embodiments (1) to (12), the electro-optical device is constructed so that the light from the point light sources is used to form an/the image in a/the plane which passes through each light-transmissive window, and so that an/the image of each point light source in the plane is included in each light-transmissive window.

(14) In an electro-optical device according to any one of the aforementioned exemplary embodiments (1) to (12), the electro-optical device is constructed so that the light from the point light sources is used to form an/the image in a/the plane which passes through each light-transmissive window, and so that each light-transmissive window is included in an/the image of each point light source in the plane.

(15) In an electro-optical device according to the aforementioned exemplary embodiments (13) or (14), a difference between a length in a first direction of the image of each point light source in the plane and a length in the first direction of each light-transmissive window, and a difference between a length in a/the second direction, which is perpendicular to the first direction, of the image of each point light source in the plane and a length in the second direction of each light-transmissive window is substantially equal to each other.

(16) In an electro-optical device according to any one of the aforementioned exemplary embodiments (1) to (12), the electro-optical device is constructed so that the light from the point light sources is used to form an image in a plane which passes through each light-transmissive window, and so that a length in a first direction of an image of each point light source in the plane is greater than a length in the first direction of each light-transmissive window, and a length in a second direction, which is perpendicular to the first direction, of the image of each point light source in the plane is less than a length in the second direction of each light-transmissive window.

(17) In an electro-optical device according to any one of the aforementioned exemplary embodiments (1) to (12), the electro-optical device is constructed so that the light from the point light sources is used to form an image in a plane which passes through each light-transmissive window, and so that, in a first direction in the plane, each light-transmissive window is included in an image of each point light source in the plane, and, in a second direction which is perpendicular to the first direction in the plane, the image of each point light source in the plane is included in each light-transmissive window.

(18) In an electro-optical device according to the aforementioned exemplary embodiments (16) or (17), a contour of an image of each point light source in the plane includes a pair of straight-line portions that are substantially parallel to the first direction.

(19) In an electro-optical device according to any one of the aforementioned exemplary embodiments (16) to (18), a contour of each light-transmissive window includes a pair of straight-line portions that are substantially parallel to the second direction.

(20) In an electro-optical device according to any one of the aforementioned exemplary embodiments (11) to (19), a shape of each light-transmissive window is a substantially square shape or a substantially rectangular shape, and a shape of an image of each point light source in the plane is a substantially square shape or a substantially rectangular shape.

(21) In an electro-optical device according to the aforementioned exemplary embodiment (20), a predetermined side of each light-transmissive window and a predetermined side of an image of each point light source in the plane is substantially parallel to each other.

(22) In an electro-optical device according to any one of the aforementioned exemplary embodiments (1) to (21), the micro-lens array is a micro Fresnel's lens array.

(23) In an electro-optical device according to any one of the aforementioned exemplary embodiments (1) to (22), the micro-lens array is formed by injection molding or photopolymerization.

(24) In an electro-optical device according to any one of the aforementioned exemplary embodiments (1) to (23), the light modulation device is a transmissive liquid crystal panel or a transflective liquid crystal panel.

(25) In an electro-optical device according to any one of the aforementioned exemplary embodiments (1) to (23), the light modulation device is a transflective liquid crystal panel.

BRIEF DESCRIPTION OF THE DRAWINGS

FIG. 1 is a vertical sectional view schematically showing the structure of a first embodiment of an electro-optical device in accordance with the present invention;

FIG. 2 is a schematic view of, in a display device shown in FIG. 1, a path taken by light emitted from a light source, from an opening in a housing to where the light exits therefrom (after one reflection);

FIG. 3 is a schematic view of, in the display device shown in FIG. 1, a path taken by the light emitted from the light source, from the opening in the housing to where the light exits therefrom (after three reflections);

FIG. 4 is a schematic view of, in the display device shown in FIG. 1, a path taken by the light emitted from the light source, from the opening in the housing to where the light exits therefrom (after four reflections);

FIG. 5 is a schematic view illustrating the arrangement (Ls=La) of openings of a liquid crystal panel, micro-lenses of a micro-lens array, and openings of light source device in the display device shown in FIG. 1, when the conditions of Formulas 1, 2, and 3 are satisfied and when n=1;

FIG. 6 is a schematic view illustrating the arrangement (Ls>La) of the openings of the liquid crystal panel, the micro-lenses of the micro-lens array, and the openings of the light source device in the display device shown in FIG. 1, when the conditions of Formulas 1, 2, and 3 are satisfied and when n=1;

FIG. 7 is a vertical sectional view schematically showing the structure of a second embodiment of an electro-optical device in accordance with the present invention;

FIG. 8 is a vertical sectional view schematically showing the structure of a third embodiment of an electro-optical device in accordance with the present invention;

FIG. 9 is a graph showing the light quantity distribution of light from each point light source and the light quantity distribution of the light from each point light source that has been superimposed upon each other, when a pitch Ps between the point light sources is 2.5 (2.5σ);

FIG. 10 is a graph showing the light quantity distribution of the light from each point light source and the light quantity distribution of the light from each point light source that has been superimposed upon each other, when the pitch Ps between the point light sources is 1.7 (1.7σ);

FIG. 11 is a graph showing the relationship between the pitch Ps of between the light sources and a light quantity ratio b/a;

FIG. 12 is a plan view schematically showing an opening in a liquid crystal panel and a light-source-device opening image in a plane which passes through each opening of the liquid crystal panel, in a fourth embodiment of an electro-optical device in accordance with the present invention;

FIG. 13 is a plan view schematically showing the opening in the liquid crystal panel and the light-source-device opening image in the plane which passes through each opening of the liquid crystal panel, in the fourth embodiment of the electro-optical device in accordance with the present invention;

FIG. 14 is a plan view schematically showing an opening in a liquid crystal panel and a light-source-device opening image in a plane which passes through each opening of the liquid crystal panel, in a fifth embodiment of an electro-optical device in accordance with the present invention;

FIG. 15 is a plan view schematically showing the opening in the liquid crystal panel and the light-source-device opening image in the plane which passes through each opening of the liquid crystal panel, in the fifth embodiment of the electro-optical device in accordance with the present invention;

FIG. 16 is a plan view schematically showing an opening in a liquid crystal panel and a light-source-device opening image in a plane which passes through each opening of the liquid crystal panel, in a sixth embodiment of an electro-optical device in accordance with the present invention;

FIG. 17 is a plan view schematically showing the opening in the liquid crystal panel and the light-source-device opening image in the plane which passes through each opening of the liquid crystal panel, in the sixth embodiment of the electro-optical device in accordance with the present invention;

FIG. 18 is a perspective view showing an example of a structure of a mobile personal computer to which the electro-optical device of any one of the embodiments of the present invention has been applied;

FIG. 19 is a perspective view of an example of a structure of a cellular phone in which the electro-optical device of any one of the embodiments of the present invention has been applied to its display section;

FIG. 20 is a perspective view of an example of a structure of a digital still camera in which the electro-optical device of any one of the embodiments of the present invention has been applied to its finder.

DETAILED DESCRIPTION OF PREFERRED EMBODIMENTS OF THE INVENTION

Hereunder, the embodiments of the electro-optical device of the present invention will be described in more detail with reference to the drawings.

FIG. 1 is a vertical sectional view schematically showing the structure of a first embodiment of an electro-optical device in accordance with the present invention. For simplification, slanting lines indicating a cross section are not shown in FIG. 1. In addition, for simplification, only the primary optic axis of light that passes the center of micro-lenses 32 is shown in FIG. 1.

A display device (electro-optical device) 1, shown in FIG. 1, is a transflective display device, and includes a light source device 2, which is a backlight, a micro-lens array plate 3, and a transflective liquid crystal panel (light modulation device) 4 including a plurality of light-transmissive windows.

The light source device 2 is positioned at the lower side in FIG. 1; the liquid crystal panel 4 is positioned at the upper side in FIG. 1; and the micro-lens array plate 3 is positioned between the light source device 2 and the liquid crystal panel 4.

The light source device 2 and the micro-lens array plate 3 are adhered (joined) together by an adhesive layer (adhesive) 5.

The micro-lens array plate 3 and the liquid crystal panel 4 are, at their outer peripheral portions (location where a display operation is not interfered with), adhered together using an adhesive (not shown).

The light-source device 2 includes a light-source section 21 and a housing (mirror box) 22.

A plurality of protrusions 23 are formed at the bottom surface (the surface at the lower side in FIG. 1) inside the housing 22. The protrusions 23 are substantially triangular in vertical sectional view.

A plurality of openings (pin holes) 25 are formed in an array in a wall 221 at the top side in FIG. 1 of the housing 22.

Reflective films 24 are provided at all of the surfaces of the protrusions 23 and areas of the surfaces (inside surfaces) inside the housing 22 excluding the areas where the plurality of openings 25 are formed. The reflective films 24 are formed of, for example, aluminum or an alloy of aluminum.

Almost all of the light emitted from the light source section 21 is, for example, reflected on the reflective film 24 once or a plurality of times, as shown in FIGS. 2, 3, and 4, and exits from each of the openings 25.

Therefore, in the light source device 2, the openings 25 form point light source projector sections (which emit light).

The micro-lens array plate 3 includes a transparent substrate 30 and a micro-lens array 31, which is provided at the top side in FIG. 1 of the substrate 30.

The micro-lens array 31 includes a plurality of micro-lenses (condenser lenses) 32 having positive power, with these micro-lenses 32 being disposed in a matrix arrangement, that is, in an array (in the horizontal direction in FIG. 1 and in a direction perpendicular to the plane of the sheet of FIG. 1).

It is preferable to use micro Fresnel's lenses (diffraction lenses) as the micro-lenses 32. In other words, it is preferable for the micro-lens array 31 to be a micro Fresnel's lens array.

Therefore, the micro-lens array 31 (the micro-lenses 32) can be made to be thin, which is advantageous from the viewpoint of reducing size and thickness.

The higher the refractive index of the structural material of the micro-lens array 31 (the micro-lenses 32), the more preferable it is. In general, the refractive index of an optical material is of the order of from 1.45 to 1.65.

The micro-lens array 31 and the substrate 30 are formed of, for example, various types of resins, such as acrylic resin or epoxy resin, or various types of glass.

The structural materials of the micro-lens array 31 and the substrate 30 may be the same or different.

The micro-lens array 31 and the substrate 30 may be integrally or separately molded.

The molding method of the micro-lens array plate 3, that is, the molding method of the micro-lens array 31 and the substrate 30, is not particularly limited, so that, for example, injection molding, photopolymerization, dry etching, or wet etching may be used. However, of these methods, injection molding and photopolymerization are preferable.

By molding the micro-lens array plate 3 by injection molding or photopolymerization, lens precision can be increased, and manufacturing can be facilitated, thereby making it possible to achieve high productivity and to reduce costs.

In particular, costs can be reduced more when injection molding is performed than when photopolymerization is performed. When photopolymerization is performed, in particular, to form a pattern on a glass substrate (glass photopolymerization), the operating temperature has a wider range than when injection molding is performed, thereby making glass photopolymerization more preferable than injection molding.

The liquid crystal panel 4 includes a transparent substrate 41; a plurality of strip-like transparent electrodes 42 which are formed on the bottom-side surface in FIG. 1 of the substrate 41 and which are provided in parallel along the horizontal direction in FIG. 1; a transparent substrate 46 disposed below the substrate 41 in FIG. 1 so as to be separated by a predetermined distance from the substrate 41; a plurality of strip-like transparent electrodes 40 which are provided in parallel along a direction perpendicular to the plane of the sheet of FIG. 1 and reflective films 44 which are formed on the top side in FIG. 1 of the substrate 46; and a liquid crystal layer 43 which contains liquid crystals and which is provided between the substrate 41 (the transparent electrodes 42) and the substrate 46 (the transparent electrodes 40).

The transparent electrodes 40 are formed at the top side in FIG. 1 of the reflective films 44. The transparent electrodes 40 and the transparent electrodes 42 are substantially orthogonal to each other, and each crossing portion of these electrodes 40 and 42 (including the portions near the crossing portions) correspond to one pixel.

By a charging operation and a discharging operation between the transparent electrodes 40 and the transparent electrodes 42, the liquid crystals of the liquid crystal layer 43 are driven.

The transparent electrodes 40 and 42 are each formed of, for example, indium tin oxide (ITO).

A plurality of openings 45 are formed in a matrix arrangement at the reflective films 44. The openings 45 are positioned at the crossing portions of the transparent electrodes 42 and the transparent electrodes 40, and each opening 45 corresponds to one pixel.

By the openings 45, the light-transmissive windows (the portions through which light can pass) of the liquid crystal panel 4 are formed.

The reflective films 44 are formed of, for example, aluminum or an alloy of aluminum.

The substrates 41 and 46 are formed of, for example, various types of glass.

A polarizer 47 is joined to the top side in FIG. 1 of the substrate 41, and a polarizer 48 is joined to the bottom side in FIG. 1 of the substrate 46.

A switching device may be provided in correspondence with one pixel on one of the substrates. Each switching device is connected to a control circuit (not shown) in order to control electrical current supply to the transparent electrodes 40 or the transparent electrodes 42, thereby controlling a charging operation and a discharging operation of the transparent electrodes 40 or the transparent electrodes 42.

The liquid crystal layer 43 contains liquid crystal molecules (not shown), and, in correspondence with the charging operation and the discharging operation of the transparent electrodes 40 or the transparent electrodes 42, the orientation of such liquid crystal molecules, that is, the liquid crystals changes.

By this, at each pixel, switching between light transmission and light shielding, and adjustment of luminance can be arbitrarily performed.

A thin-film diode (TFD) or a thin-film transistor (TFT) may be used as a switching device, for example. When a thin-film transistor is used as a switching device, each transparent electrode on the substrate where each thin-film transistor is provided is provided, for example, in a dot-like arrangement in correspondence with one pixel, and each transparent electrode on the substrate opposing each transparent electrode formed on the substrate where each thin-film transistor is provided is provided on the entire surface of the corresponding substrate.

In the display device 1, as shown in FIGS. 5 and 6, where a pitch between the openings (point light source projector portions) 25 of the light source device 2 is Ps, a pitch between the openings (light-transmissive windows) 45 of the liquid crystal panel 4 is Pa, a pitch between the micro-lenses 32 of the micro-lens array 31 is PL, an optical distance between the openings 25 of the light source device 2 and the micro-lens array 31 is Ls, and an optical distance between the micro-lens array 31 and the openings 45 of the liquid crystal panel 4 is La, the openings 25 of the light source device 2, the micro-lenses 32 of the micro-lens array 31, and the openings 45 of the liquid crystal panel 4 are disposed so that the conditions of the following Formulas 1 and 2 are satisfied.

$$PL = \{Ps \cdot Pa/(Ps+Pa)\} \cdot n \text{ (where } n \text{ is a natural number)} \quad (1)$$

$$La/Ls = Pa/Ps \quad (2)$$

In particular, it is preferable that, in Formula 1, n is a natural number other than 2.

Here, the optical distances are distances obtained when the environment is assumed as being a vacuum, that is, distances obtained after dividing the actual distances by the refractive indices of the material making up the optical paths.

The conditions indicated in Formulas 1 and 2 are assumed as being satisfied in each of the horizontal direction in FIG. 1 and in a direction perpendicular to the plane of the sheet of FIG. 1.

Where a focal length of each micro-lens 32 is f, the structure is such as to satisfy the condition of Formula 3. Formula 3 is a conditional expression to form an image in correspondence with the shape of each opening 25 of the light source device 2 (each opening 25 image) at each opening 45 of the liquid crystal panel 4 by each micro-lens 32.

$$1/Ls + 1/La = 1/f \quad (3)$$

The pitch Ps between the openings 25 of the light source device 2, the pitch Pa between the openings 45 of the liquid crystal panel 4, the pitch PL between the micro-lenses 32, the optical distance Ls between the openings 25 of the light source device 2 and the micro-lens array 31, the optical distance La between the micro-lens array 31 and the openings 45 of the liquid crystal panel 4, and the focal length f of each micro-lens 32 are properly set so as to satisfy the conditions of Formulas 1, 2, and 3, in accordance with, for example, the application.

For example, when a transflective display device of a portable electronic apparatus is used, it is preferable to set these values, for example, as follows.

It is preferable that the pitch Ps between the openings (point light source projector sections) 25 of the light source device 2 be of the order of 20 to 500 µm. It is preferable that the pitch Pa between the openings (light-transmissive windows) 45 of the liquid crystal panel 4 be of the order of 20 to 500 µm. It is preferable that the pitch PL between the micro-lenses 32 be of the order of 10 to 250 µm. It is preferable that the optical distance Ls between the openings 25 of the light source device 2 and the micro-lens array 31 be of the order of 0.1 to 2 mm. It is preferable that the optical distance La between the micro-lens array 31 and the openings 45 of the liquid crystal panel 4 be of the order of 0.1 to 2 mm. It is preferable that the focal length f of each micro-lens 32 be of the order of 0.1 to 1 mm.

For example, the dimensions and shapes in plan view of the micro-lenses 32 are not particularly limited, so that, for example, they may be properly set in accordance with, for example, the shapes of the pixels at the liquid crystal panel 4 side.

The shapes of the micro-lenses 32 in plan view are preferably similar to the shapes of the pixels of the liquid crystal panel 4, and may be, for example, rectangular, square, or circular shapes.

The optical distances Ls and La can be adjusted by, for example, setting the thicknesses of, for example, the micro-lens array plate 3 and the substrate 46 at desired values.

FIGS. 5 and 6 are each schematic views showing the disposition (positional relationship) of each opening 25 of the light source device 2, each micro-lens 32 of the micro-lens array 31, and each opening 45 of the liquid crystal panel 4, where the conditions of Formulas 1, 2, and 3 are satisfied and when n=1. For simplification, only the primary optic axis of light that passes through the center of each micro-lens 32 is shown in FIGS. 5 and 6.

Here, each micro-lens 32 possesses an optical characteristic of causing light of all components (light of all optical axes) that exit from each opening 25 of the light source device 2 to form an image at each opening 45 of the liquid crystal panel 4.

FIG. 5 shows the case where the optical distance Ls and the optical distance La are set equal to each other, that is, the case where the pitch Ps between the openings 25 and the pitch Pa between the openings 45 are set equal to each other.

As shown in FIG. 5, almost all of the light that has exited from a predetermined opening 25 of the light source device 2 is focused at an opening 45 by the action of a micro-lens 32.

For example, of the light beams that have exited from the leftmost opening 25 in FIG. 5, a light beam 61 incident upon the leftmost micro-lens 32 in FIG. 5 is focused at the leftmost opening 45 in FIG. 5 by its corresponding micro-lens 32, and a light beam 62 incident upon the second micro-lens 32 from the left in FIG. 5 is focused at the second opening 45 from the left in FIG. 5 by the corresponding micro-lens 32. Similarly, each of the other light beams is focused at their corresponding openings 45 by their corresponding micro-lenses 32, respectively.

Similarly, of the light beams that have exited from the second opening 25 from the left in FIG. 5, a light beam 63 incident upon the second micro-lens 32 from the left in FIG. 5 is focused at the leftmost opening 45 in FIG. 5 by the corresponding micro-lens 32, and a light beam 64 incident upon the third micro-lens 32 from the left in FIG. 5 is focused at the second opening 45 from the left in FIG. 5 by the corresponding micro-lenses 32. Similarly, each of the other light beams is focused at the corresponding openings 45 by the corresponding micro-lenses 32, respectively.

Similarly, the other light beams that have exited from the third to sixth openings 25 from the left in FIG. 5 are focused at their corresponding openings 45 by the corresponding micro-lenses 32.

When a predetermined opening 45 is looked at, the light beams that have exited from a plurality openings 25 are focused at this opening 45 by the micro-lens array 31.

When a predetermined micro-lens 32 is examined, this micro-lens 32 causes the light that has exited from a plurality of openings 25 to be focused at a plurality of openings 45.

In this way, in the display device 1, the light emitted from the light source device 2 (each of the openings 25) can be efficiently focused at the openings 45, so that it is possible to increase the efficiency with which the light emitted from the light source device 2 is used.

Since the light beams from a plurality of (many) openings 25 are focused at one opening 45, there is the advantage that the brightness is averaged. In other words, even if there are variations in, for example, the quantity of light from each opening 25 and the position of each opening 25, the light that is gathered at the opening 45 has a value which is equal to an averaged value of the light from the plurality of openings 25, so that there is almost no difference in the quantity of light between pixels. Therefore, it is possible to achieve a display with high uniformity.

In the display device 1, one adjustment step is provided in a positional adjustment operation during manufacturing (assembly).

In particular, since light exiting angles θ1 and θ2 to adjacent points are relatively small, the averaging effects are large, so that it is not necessary to strictly adjust the positional relationship between the light source device 2 (each opening 25) and the micro-lens array 31. In other words, during positional adjustment, each opening 45 is positioned at a location of focus, which is determined by the micro-lens array 31 and the light source device 2 (each opening 25) that are in a satisfactory positional relationship. Only one such adjustment step is required.

This makes it possible to carry out positional adjustment easily, quickly, and reliably, thereby making it possible to achieve high productivity and making it advantageous for mass production.

By setting Ls and La equal to each other, the focal length f of each micro-lens 32 can be set to be the longest (the numerical aperture NA can be set to be the smallest). This facilitates the production of the micro-lens array 31, so that precision can be increased and aberrations can be reduced.

By making n=1, compared to the case where n>1, the pitch PL between the micro-lenses 32 can be set to be small, so that the numerical aperture NA of each lens can be set to be small, which is preferable.

FIG. 6 shows the case where the optical distance Ls is set to be larger than the optical distance La, that is, the case where the pitch Ps between the openings 25 is set to be larger than the pitch Pa between the openings 45.

As in the case where the optical distance Ls and the optical distance La are set equal to each other, in this case also, almost all of the light that has exited from a predetermined opening 25 of the light source device 2 is focused at an opening 45 by the action of a micro-lens 32.

In this way, when the optical distance Ls is set to be larger than the optical distance La, the pitch Ps between the openings (point light source projector sections) 25 of the light source device 2 can be set to be relatively large (the number of openings 25 can be made to be relatively small), thereby facilitating production.

In the display device 1, in plan view (when viewed from the upper side in FIG. 1), it is preferable that the shape of each opening (each point light source projector section) 25 of the light source device 2 and the shape of each opening (light-transmissive window) 45 of the liquid crystal panel 4 be similar.

It is preferable that a ratio (S25/S45) between an area (size) S25 of each opening 25 and an area (size) S45 of each opening 45 be equal to a ratio (Ps/Pa) between the pitch Ps between the openings 25 and the pitch Pa between the openings 45, that is, to a ratio (Ls/La) between the optical distance Ls and the optical distance La.

By this, the light emitted from the light source device 2 (each opening 25) can be efficiently focused at each opening 45, thereby making it possible to further increase the efficiency with which the light emitted from the light source device 2 is used.

For example, when a transflective display device is used, the area S25 of each opening 25 is, preferably, of the order of 3 to 50% of the area of one pixel.

Next, a description of the operation of the display device 1 will be provided.

As shown in FIG. 1, light that has passed through the adhesive layer 5 and the substrate 30 after being emitted from the light source section 21 of the display device 1 and exiting from each of the openings 25 is incident upon each micro-lens 32 of the micro-lens array 31, and, as mentioned above, exits from each micro-lens 32 so as to be focused at each opening 45 by the action of each micro-lens 32.

The light that has exited from each micro-lens 32 is polarized by the polarizer 48. The polarized light passes through the substrate 46, and, then, is focused at each opening 45 and passes through each opening 45.

In the present invention, a retardation film (not shown) may be provided in the display device 1.

The light that has passed through each of the openings 45 is modulated in intensity by the liquid crystals of the liquid crystal layer 43 whose orientation has been controlled by a voltage applied between the transparent electrodes 42 and the transparent electrodes 40. Then, the light passes through the substrate 41, is polarized by the polarizer 47, and exits to the outside.

In this way, a predetermined image (electronic image) is displayed on the screen of the display device 1.

Since the liquid crystal panel 4 of the display device 1 is a transflective panel, when the outside is relatively bright, a display operation can be carried out by reflecting light from the outside by the reflective films 44.

When the outside is relatively dark, as mentioned above, a display operation can be performed by driving the light source device 2 and passing the light from the light source device 2 through each opening 45 at each of the reflective films 44.

As mentioned above, according to the display device 1, the light emitted from the light source device 2 (each opening 25) can be efficiently focused at each opening 45, so that it is possible to increase the efficiency with which the light emitted from the light source device 2 is used.

In other words, even if the area of each reflective film 44 is made to be large, and the area of each opening 45 provided at each reflective film 44, is made to be small, the light from the light source device 2 can be efficiently focused at each opening 45. Therefore, the quantity of light that passes through each opening 45 can be made to be large, so that it is possible to realize a transflective liquid crystal display device (direct viewing liquid crystal display device) having both a high reflection ratio of outside light and a high transmittance ratio of light from the light source device 2.

In the display device 1, it is not necessary to use a high-cost prism sheet, so that the number of parts and costs can be reduced.

In the present invention, the point light sources are not limited to those having the above-described structure, so that, for example, light-emitting diodes (LEDs), laser diodes, organic EL (electroluminescence) devices, or inorganic EL devices may be used.

When laser diodes are used as the point light sources, and a liquid crystal panel is used as the light modulation device, the polarizer may be omitted. This makes it possible to further increase the efficiency with which the light from the point light sources is used, and to reduce the number of component parts.

A description of a second embodiment of an electro-optical device of the present invention will now be provided.

FIG. 7 is a vertical sectional view schematically showing the structure of the second embodiment of the electro-optical device of the present invention. For simplification, slanting lines indicating a cross section are not shown in FIG. 7. In addition, for simplification, only the primary optic axis of light that passes the center of micro-lenses 32 is shown in FIG. 7.

Hereunder, the description of a display device (electro-optical device) 1 of the second embodiment will be centered on the differences between it and the display device 1 of the first embodiment, so that similar features will not be discussed in the description.

The display device 1, shown in FIG. 7, is a transmissive display device and includes a transmissive liquid crystal panel 4a in place of the transflective liquid crystal panel 4 of the display device 1 of the above-described first embodiment. The other structural features are the same as those of the first embodiment.

In place of the reflective films 44 of the liquid crystal panel 4 used in the above-described first embodiment, the liquid crystal panel 4a includes black matrices 49 where a plurality of openings (light-transmissive windows) 491, disposed in a matrix arrangement, are formed.

Transparent electrodes 40 are provided in parallel in the horizontal direction in FIG. 7, whereas transparent electrodes 42 are provided in parallel in a direction perpendicular to the plane of the sheet of FIG. 7.

The black matrices 49 are provided so as to perform light-shielding operations between pixels, that is, between adjacent transparent electrodes 40 and adjacent transparent electrodes 42, respectively.

The display device 1 of the second embodiment provides the same advantages as those of the first embodiment.

More specifically, it is possible to provide the display device 1 as a transmissive liquid crystal display device (direct-viewing liquid crystal display device) in which light from light source device 2 is used with very high efficiency.

Next, a description of a third embodiment of an electro-optical device of the present invention will be provided.

FIG. 8 is a vertical sectional view schematically showing the structure of the third embodiment of the electro-optical device of the present invention. For simplification, slanting lines indicating a cross section are not shown in FIG. 8. In addition, for simplification, only the primary optic axis of light that passes the center of micro-lenses 32 is shown in FIG. 8.

Hereunder, the description of a display device (electro-optical device) 1 of the third embodiment will be centered on the differences between it and the display device 1 of the first embodiment, so that similar features will not be discussed in the description.

Although a display device 1, shown in FIG. 8, is a transflective display device including a transflective liquid crystal panel (light modulation device) 4, it may be a transmissive display device including a transmissive liquid crystal panel (light modulation device) 4a like that of the above-described second embodiment.

Even in the case where, as in the above-described first and second embodiments, the light that has exited from openings (point light source projector sections) 25 is focused by a micro-lens array 31, in a state where a micro-lens array 31 (micro-lens array plate 3) is not used, the light quantity distribution of the light from the openings 25 in a plane 71 that passes through each opening 45, shown in FIG. 8, is reflected.

A pitch Ps between the openings (point light source projector sections) 25 of the display device 1 of the third embodiment is set so that, in the state where the micro-lens array 31 (micro-lens array plate 3) is not provided, the quantity of light from the plurality of openings 25 in the plane 71 which passes through each opening 45 is substantially uniform.

By this, differences between quantities of light between the openings 45 (between the pixels) can be reduced or eliminated, thereby making it possible to reduce or eliminate unevenness in the display. In other words, it is possible to achieve a uniform display.

More specifically, it is preferable to set the pitch Ps between the openings 25 as follows.

In the state where the micro-lens array 31 (micro-lens array plate 3) is not provided, where a standard deviation in the distribution of the quantity of light from each opening 25 in the plane 71 is $\sigma$, the pitch Ps between the openings 25 is, preferably, equal to or less than $2.3\sigma$; more preferably, equal to or less than $1.8\sigma$; and even more preferably, of the order of $0.3\sigma$ to $1.5\sigma$. The standard deviation $\sigma$ of the distribution of the quantity of light possesses a length dimension.

In other words, in the state where the micro-lens array 31 (micro-lens array plate 3) is not provided, where a maximum value and a minimum value of the quantity of light from the plurality of openings 25 in the plane 71 are a and b (see FIG. 9), respectively, it is preferable that the pitch Ps between the openings 25 be set so that a ratio b/a (called "light quantity ratio") between the maximum value "a" and the minimum value "b" of the quantity of light is equal to or greater than 0.9; it is more preferable that it be set so that the light quantity ratio is equal to or greater than 0.99; and it is even more preferable that it be set so that the light quantity ratio is equal to or greater than 0.995. The maximum value "a" and the minimum value "b" are each values for portions excluding the end portions (outer-side portions).

By this, it is possible to further reduce or eliminate differences in the quantities of light between the openings 45 (pixels), so that a display with even higher uniformity can be achieved.

The inventor conducted a predetermined simulation for the display device 1. This simulation will be described below.

The light quantity distribution of the light that has exited from one of the openings 25 of the light source device 2 of the display device 1, that is, the light that has exited from one of the point light sources is a Gauss distribution (normal distribution) or a distribution which approximates to a Gauss distribution, with the light quantity distribution being measured in a plane perpendicular to the primary optic axis.

Therefore, using the Gauss distribution having a standard deviation $\sigma$ of 1 as the light quantity distribution of the light that has exited from one of the point light sources, with the light quantity distribution being measured in a plane perpendicular to the primary optic axis, this simulation was conducted.

First, assuming the case where a plurality of similar point light sources were placed side by side in one row at equal pitches (pitches Ps), a plurality of Gauss distributions (light quantity distributions) having standard deviations $\sigma$ of 1 were placed side by side in one row, and superimposed upon each other.

FIG. 9 is a graph showing the distribution of the quantity of light from each point light source and the distribution of the quantity of light obtained when the light from each point light source is superimposed on each other, in the case where the pitch Ps between the point light sources is 2.5 (2.5σ). FIG. 10 is a graph showing the distribution of the quantity of light from each point light source and the distribution of the quantity of light obtained when the light from each point light source is superimposed on each other, in the case where the pitch Ps between the point light sources is 1.7 (1.7σ).

The vertical axis of each graph represents the light quantity, and the horizontal axis thereof represents the position (distance from a predetermined standard point). In each graph, the position where the quantity of light from each point light source becomes a maximum corresponds to the position of its corresponding point light source.

Next, the pitch Ps between the point light sources was varied in order to obtain the light quantity ratio b/a for each pitch Ps.

The results are shown in FIG. 11. More specifically, FIG. 11 is a graph showing the relationship between the pitch Ps between the point light sources and the light quantity ratio b/a. The vertical axis of the graph represents the light quantity ratio b/a, and the horizontal axis thereof represents the pitch Ps between the point light sources.

The light quantity ratio b/a becomes equal to or greater than 0.99 where the pitch Ps between the point light sources becomes equal to or less than 1.8σ.

As shown in FIGS. 9 and 11, where the pitch Ps between the point light sources is 2.5σ, the light quantity obtained where the light from each point light source is superimposed upon each other is slightly uneven. In other words, the light quantity ratio b/a is approximately 0.84.

On the other hand, as shown in FIGS. 10 and 11, when the pitch Ps between the point light sources is 1.7σ, the light quantity obtained where the light from each point light source is superimposed upon each other is uniform. In other words, the light quantity ratio b/a becomes approximately 1. In this case, it is possible to achieve a very uniform display.

As can be understood from the foregoing description, according to the display device 1 of the third embodiment, since the pitch Ps between the openings 25 is set as mentioned above, so that variations in the brightness between the openings 45 (the pixels) can be reduced or eliminated, it is possible to reduce or eliminate display unevenness. In other words, it was possible to achieve a uniform display.

This display device 1 provides the same advantages as those of the display device 1 of the first embodiment.

Next, a description of a fourth embodiment of an electro-optical device of the present invention will be provided. The electro-optical device of the fourth embodiment is constructed so that light from openings (point light source projector sections) 25 of light source device 2 is used to form an image in a plane 71 that passes through each opening (light-transmissive window) 45 of a liquid crystal panel (light modulation device) 4 (see FIG. 8), and so that an area of a portion where each opening 25 image in the plane 71 (light illumination area in the plane 71) and each opening 45 overlap does not vary to the extent possible even when each opening 25 image and each opening 45 are displaced relative to each other in predetermined directions in the plane 71 (in a first direction and a second direction that is perpendicular to the first direction in the plane 71). Hereunder, a more detailed description will be provided.

FIGS. 12 and 13 are schematic plan views of, in the fourth embodiment of the electro-optical device of the present invention, an opening (light-transmissive window) of the liquid crystal panel (light modulation device) and an image of an opening (point light source projector section) of the light source device in the plane passing through each opening of the liquid crystal panel.

In FIGS. 12 and 13, the image of the opening (point light source projector section) of the light source device is indicated by slanting lines. In FIGS. 12 and 13, the horizontal direction is the first direction in the plane 71 and the vertical direction is the second direction in the plane 71 (a direction perpendicular to the first direction).

Hereunder, the description of a display device (electro-optical device) 1 of the fourth embodiment will be centered on the differences between it and the display device 1 of the first embodiment, so that similar features will not be discussed in the description.

The display device 1 of the fourth embodiment may be a transflective display device including a transflective liquid crystal panel (light modulation device) 4 like that of the first embodiment, or a transmissive display device including a transmissive liquid crystal panel (light modulation device) 4a like that of the above-described second embodiment.

As shown in FIG. 12, the display device 1 of the fourth embodiment is constructed so that light from the openings (point light source projector sections) 25 of the light source device 2 is used to form an image in the plane 71 that passes through each opening (light-transmissive window) 45 of the liquid crystal panel (light modulation device) 4 (see FIG. 8), and so that an image (illumination area) 26 of each opening 25 in the plane 71 is included in each opening 45. In other words, various conditions, such as the shape, dimension, and arrangement of each opening 25 and each opening 45, are set so that the image 26 of each opening 25 is included in each opening 45.

In the embodiment, each opening 45 is rectangular in shape, with its short sides 451 and 453 being substantially parallel to the first direction, and its long sides 452 and 454 being substantially parallel to the second direction that is perpendicular to the first direction.

In the embodiment, each opening 25, that is, the image 26 of each opening 25 is rectangular in shape, with its short sides 261 and 263 being substantially parallel to the first direction, and its long sides 262 and 264 being substantially parallel to the second direction.

Therefore, the short side (one side) 451 of each opening 45 is substantially parallel to the short side (one side) 261 of the image 26 of each opening 25.

FIG. 12 shows a state in which the center of an image 26 of an opening 25 and the center of an opening 45 coincide (a state in which the image 26 is positioned at an ideal location with respect to the opening 45); and FIG. 13 shows a state in which the center of the image 26 of the opening 25 is displaced from the center of the opening 45.

In the display device 1, as shown in FIG. 13, even when the focusing position of the light from each opening 25 is displaced, so that the center of the image 26 of each opening 25 and the center of each opening 45 are separated from each other, it is possible to prevent or restrict each image 26 from protruding from each opening 45.

By this, it is possible to reduce or eliminate variations in brightness between the openings 45 (pixels), so that a uniform display can be achieved.

As shown in FIG. 12, the difference between a length L3 (length of the short side 261) in the first direction of the image 26 of each opening 25 in the plane 71 and a length L1 (length of the short side 451) in the first direction of each opening 45 and the difference between a length L4 (length of the long side 262) in the second direction, which is perpendicular to the first direction, of the image 26 of each opening 25 in the plane 71 and a length L2 (length of the long side 452) in the second direction of each opening 45 are substantially equal.

In this way, by making the difference between the lengths L3 and L1 and the difference between the lengths L4 and L2 substantially equal to each other, the displacement amount in the first direction up to the location where the image 26 protrudes from the opening 45 in the first direction where the image 26 and the opening 45 are displaced in the first direction from the state shown in FIG. 12 where the center of the image 26 of the opening 25 and the center of the opening 45 coincide is substantially equal to the displacement amount in the second direction up to the location where the image 26 protrudes from the opening 45 in the second direction when the image 26 and opening 45 are displaced in the second direction from the state shown in FIG. 12. Therefore, the image 26 does not easily protrude from the opening 45, so that variations in brightness between the openings 45 (pixels) can be further reduced or eliminated, thereby making it possible to achieve a more uniform display.

As described above, according to the display device 1 of the fourth embodiment, in the plane 71, the image 26 of each opening 25 is included in each opening 45, so that the area of each portion where the image 26 of each opening 25 and each opening 45 are superimposed upon each other does not change even when the image 26 of each opening 25 and each opening 45 are displaced in the first direction or the second direction. Therefore, even when the focusing position of the light from each opening 25 is slightly displaced by, for example, changes with time, thermal expansion, positional displacements, or errors in, for example, the manufacturing process, it is possible to reduce or even eliminate variations in brightness between the openings 45 (pixels), so that unevenness in the display can be reduced or eliminated. In other words, it is possible to achieve a uniform display.

Since the image 26 of each opening 25 is included in each opening 45, the light emitted from the light source device 2 is used with very high efficiency, so that this is advantageous when the efficiency with which light is used takes priority.

This display device 1 provides the same advantages as those of the above-described first embodiment.

Here, in the display device 1 of the fourth embodiment, as in the above-described third embodiment, in the state where a micro-lens array 31 (micro-lens array plate 3) is not provided, it is preferable that a pitch Ps between the openings (point light source projector sections) 25 be set so that the quantity of light from the plurality of openings 25 in the plane 71 that passes through each of the openings 45 is substantially uniform. The structure and advantages in this case are the same as those of the third embodiment, so that they will not be described below.

In the present invention, the shapes of the openings 45 and the shapes of the openings 25 (the shapes of the images 26 of the openings 25) are not limited to rectangular shapes, so that they may be other shapes, such as square, circular, or elliptical shapes, for example.

In the present invention, the shapes of the openings 45 and the shapes of the openings 25 (shapes of the images 26 of the openings 25) may be the same or different from each other.

Next, a description of a fifth embodiment of an electro-optical device of the present invention will be provided. The electro-optical device of the fifth embodiment is constructed so that light from openings (point light source projector sections) 25 of light source device 2 is used to form an image in a plane 71 that passes through each opening (light-transmissive window) 45 of a liquid crystal panel (light modulation device) 4 (see FIG. 8), and so that an area of a portion where each opening 25 image in the plane 71 (light illumination area in the plane 71) and each opening 45 overlap does not vary to the extent possible even when the image of each opening 25 and each opening 45 are displaced relative to each other in predetermined directions in the plane 71 (in a first direction and a second direction that is perpendicular to the first direction in the plane 71). Hereunder, a more detailed description will be provided.

FIGS. 14 and 15 are schematic plan views of, in the fifth embodiment of the electro-optical device of the present invention, an opening (light-transmissive window) of the liquid crystal panel (light modulation device) and an image of an opening (point light source projector section) of the light source device in the plane passing through each opening of the liquid crystal panel.

In FIGS. 14 and 15, the image of the opening (point light source projector section) of the light source device is indicated by slanting lines. In FIGS. 14 and 15, the horizontal direction is the first direction in the plane 71 and the vertical direction is the second direction in the plane 71 (a direction perpendicular to the first direction).

Hereunder, the description of a display device (electro-optical device) 1 of the fifth embodiment will be centered on the differences between it and the display device 1 of the first embodiment, so that similar features will not be discussed in the description.

The display device 1 of the fifth embodiment may be a transflective display device including a transflective liquid crystal panel (light modulation device) 4 like that of the first embodiment, or a transmissive display device including a transmissive liquid crystal panel (light modulation device) 4a like that of the above-described second embodiment.

As shown in FIG. 14, the display device 1 of the fifth embodiment is constructed so that light from the openings (point light source projector sections) 25 of the light source device 2 is used to form an image in the plane 71 that passes through each opening (light-transmissive window) 45 of the liquid crystal panel (light modulation device) 4 (see FIG. 8), and so that each opening 45 is included in an image (illumination area) 26 of each opening 25 in the plane 71. In other words, various conditions such as the arrangement, dimensions, and shapes of the openings 25 and 45 are set so that each opening 45 is included in the image 26 of each opening 25.

In the embodiment, each opening 45 is rectangular in shape, with its short sides 451 and 453 being substantially parallel to the first direction, and its long sides 452 and 454 being substantially parallel to the second direction that is perpendicular to the first direction.

In the embodiment, each opening 25, that is, the image 26 of each opening 25 is rectangular in shape, with its short sides 261 and 263 being substantially parallel to the first direction, and its long sides 262 and 264 being substantially parallel to the second direction.

Therefore, the short side (one side) 451 of each opening 45 is substantially parallel to the short side (one side) 261 of the image 26 of each opening 25.

FIG. 14 shows a state in which the center of an image 26 of an opening 25 and the center of an opening 45 coincide (a state in which the image 26 is positioned at an ideal location with respect to the opening 45); and FIG. 15 shows a state in which the center of the image 26 of the opening 25 and the center of the opening 45 are displaced from each other.

In the display device 1, as shown in FIG. 15, even when the focusing position of the light from each opening 25 is displaced, so that the center of the image 26 of each opening 25 and the center of each opening 45 are displaced from each other, it is possible to prevent or restrict each opening 45 from protruding from each image 26.

By this, it is possible to reduce or eliminate variations in brightness between the openings 45 (pixels), so that a uniform display can be achieved.

As shown in FIG. 14, the difference between a length L3 (length of the short side 261) in the first direction of the image 26 of each opening 25 in the plane 71 and a length L1 (length of the short side 451) in the first direction of each opening 45 and the difference between a length L4 (length of the long side 262) in the second direction, which is perpendicular to the first direction, of the image 26 of each opening 25 in the plane 71 and a length L2 (length of the long side 452) in the second direction of each opening 45 are substantially equal.

In this way, by making the difference between the lengths L3 and L1 and the difference between the lengths L4 and L2 substantially equal to each other, the displacement amount in the first direction up to the location where the opening 45 protrudes from the image 26 in the first direction where the image 26 and the opening 45 are displaced in the first direction from the state shown in FIG. 14 where the center of the image 26 of the opening 25 and the center of the opening 45 coincide is substantially equal to the displacement amount in the second direction up to the location where the opening 45 protrudes from the image 26 in the second direction when the image 26 and opening 45 are displaced in the second direction from the state shown in FIG. 14. Therefore, the opening 45 does not easily protrude from the image 26, so that variations in brightness between the openings 45 (pixels) can be further reduced or eliminated, thereby making it possible to achieve a more uniform display.

As described above, according to the display device 1 of the fifth embodiment, in the plane 71, each opening 45 is included in the image 26 of each opening 25, so that the area of each portion where the image 26 of each opening 25 and each opening 45 overlap does not change even where the image 26 of each opening 25 and each opening 45 are displaced in the first direction or the second direction. Therefore, even where the focusing position of the light from each opening 25 is slightly displaced by, for example, changes with time, thermal expansion, positional displacements, or errors in, for example, the manufacturing process, it is possible to reduce or to eliminate variations in brightness between the openings 45 (pixels), so that unevenness in the display can be reduced or eliminated. In other words, it is possible to achieve a uniform display.

Since each opening 45 is included in the image 26 of each opening 25, the quantity of light that is focused at each opening 45 can be increased, so that this is advantageous when luminance takes priority.

This display device 1 provides the same advantages as those of the above-described first embodiment.

Here, in the display device 1 of the fifth embodiment, as in the above-described third embodiment, in the state where a micro-lens array 31 (micro-lens array plate 3) is not provided, it is preferable that a pitch Ps between the openings (point light source projector sections) 25 be set so that the quantity of light from the plurality of openings 25 in the plane 71 that passes through each of the openings 45 be substantially uniform. The structure and advantages in this case are the same as those of the third embodiment, so that they will not be described below.

In the present invention, the shapes of the openings 45 and the shapes of the openings 25 (the shapes of the images 26 of the openings 25) are not limited to rectangular shapes, so that they may be other shapes, such as square, circular, or elliptical shapes, for example.

In the present invention, the shapes of the openings 45 and the shapes of the openings 25 (shapes of the images 26 of the openings 25) may be the same or different from each other.

Next, a description of a sixth embodiment of an electro-optical device of the present invention will be provided.

The electro-optical device of the sixth embodiment is constructed so that light from openings (point light source projector sections) 25 of light source device 2 is used to form an image in a plane 71 that passes through each opening (light-transmissive window) 45 of a liquid crystal panel (light modulation device) 4 (see FIG. 8), and so that an area of a portion where the image of each opening 25 in the plane 71 (light illumination area in the plane 71) and each opening 45 overlap does not vary to the extent possible even when the image of each opening 25 and each opening 45 are displaced relative to each other in predetermined directions in the plane 71 (in a first direction and a second direction that is perpendicular to the first direction in the plane 71). Hereunder, a more detailed description will be provided.

FIGS. 16 and 17 are schematic plan views of, in the sixth embodiment of the electro-optical device of the present invention, an opening (light-transmissive window) of the liquid crystal panel (light modulation device) and an image of an opening (point light source projector section) of the light source device in the plane passing through each opening of the liquid crystal panel.

In FIGS. 16 and 17, the image of the opening (the point light source projector section) of the light source device is indicated by slanting lines. In FIGS. 16 and 17, the horizontal direction is the first direction in,the plane 71 and the vertical direction is the second direction in the plane 71 (a direction perpendicular to the first direction).

Hereunder, the description of a display device (electro-optical device) 1 of the sixth embodiment will be centered on the differences between it and the display device 1 of the first embodiment, so that similar features will not be discussed in the description.

The display device 1 of the sixth embodiment may be a transflective display device including a transflective liquid crystal panel (light modulation device) 4 like that of the first embodiment, or a transmissive display device including a transmissive liquid crystal panel (light modulation device) 4a like that of the above-described second embodiment.

As shown in FIG. 16, the display device 1 of the sixth embodiment is constructed so that light from openings (point light source projector sections) 25 of the light source device 2 is used to form an image in the plane 71 that passes through each opening (light-transmissive window) 45 of a liquid crystal panel (light modulation device) 4 (see FIG. 8); so that, in the first direction, each opening 45 is included in an image (illumination area) 26 of each opening 25; and so that, in the second direction, which is perpendicular to the first direction, the image 26 of each opening 25 is included in each opening 45. In other words, various conditions, such as the arrangement, dimensions, and shapes of the openings 25 and 45 are set so that, in the first direction, each opening 45 is included in the image 26 of each opening 25 and so that, in the second direction, the image 26 of each opening 25 is included in each opening 45.

In the embodiment, each opening 45 is rectangular in shape, with its short sides 451 and 453 being substantially parallel to the first direction, and its long sides 452 and 454 being substantially parallel to the second direction that is perpendicular to the first direction. In other words, the contour of each opening 45 includes a pair of straight-line portions (the long sides 452 and 454) that are substantially parallel to the second direction.

In the embodiment, each opening 25, that is, the image 26 of each opening 25 is rectangular in shape, with its short sides 261 and 263 being substantially parallel to the second direction, and its long sides 262 and 264 being substantially parallel to the first direction. In other words, the contour of the image 26 of each opening 25 includes a pair of straight-line portions (the long sides 262 and 264) that are substantially parallel to the first direction.

Therefore, the short side (one side) 451 of each opening 45 is substantially parallel to the long side (one side) 262 of the image 26 of each opening 25.

A length (length of the long side 262) L5 in the first direction of the image 26 of each opening 25 is longer than a length (length of the short side 451) L1 in the first direction of each opening 45, and a length (length of the short side 261) L6 in the second direction, which is perpendicular to the first direction, of the image 26 of each opening 25 is shorter than a length (length of the long side 452) L2 in the second direction of each opening 45.

FIG. 16 shows a state in which the center of an image 26 of an opening 25 and the center of an opening 45 coincide (a state in which the image 26 is positioned at an ideal location with respect to the opening 45); and FIG. 17 shows a state in which the center of the image 26 of the opening 25 and the center of the opening 45 are displaced from each other.

In the display device 1, as shown in FIG. 17, even when the focusing position of the light from each opening 25 is displaced, so that the center of the image 26 of each opening 25 and the center of each opening 45 are displaced from each other, it is possible to prevent or restrict each opening 45 from protruding from each image 26 in the first direction and to prevent or restrict each image 26 from protruding from each opening 45 in the second direction.

In addition, since the contour of the image 26 of each opening 25 includes a pair of straight-line portions (the long sides 262 and 264) that are substantially parallel to the first direction, when each image 26 and each opening 45 are displaced in the first direction, the area of each portion where each image 26 and each opening 45 overlap does not change.

Similarly, since the contour of each opening 45 includes a pair of straight-line portions (long sides 452 and 454) that are substantially parallel to the second direction, when each image 26 and each opening 45 are displaced in the second direction, the area of each portion where each image 26 and each opening 45 overlap does not change.

By this, it is possible to reduce or eliminate variations in brightness between the openings 45 (pixels), so that a uniform display can be achieved.

As described above, according to the display device 1 of the sixth embodiment, in the first direction, each opening 45 is included in the image 26 of each opening 25, and, in the second direction, the image 26 of each opening 25 is included in each opening 45, so that the area of each portion where the image 26 of each opening 25 and each opening 45 overlap does not change even when the image 26 of each opening 25 and each opening 45 are displaced in the first direction or the second direction. Therefore, even when the focusing position of the light from each opening 25 is slightly displaced by, for example, changes with time, thermal expansion, positional displacements, or errors in, for example, the manufacturing process, it is possible to reduce or eliminate variations in brightness between the openings 45 (pixels), so that unevenness in the display can be reduced or eliminated. In other words, it is possible to achieve a uniform display.

This display device 1 provides the same advantages as those of the above-described first embodiment.

Here, in the display device 1 of the sixth embodiment, as in the above-described third embodiment, in the state where a micro-lens array 31 (micro-lens array plate 3) is not provided, it is preferable that a pitch Ps between the openings (point light source projector sections) 25 be set so that the quantity of light from the plurality of openings 25 in the plane 71 that passes through each of the openings 45 is substantially uniform. The structure and advantages in this case are the same as those of the third embodiment, so that they will not be described below.

In the present invention, the shapes of the openings 45 and the shapes of the openings 25 (the shapes of the images 26 of the openings 25) are not limited to rectangular shapes, so that they may be other shapes, such as square shapes, for example. It is, however, preferable that they have quadrilateral shapes, such as rectangular or square shapes, and, particularly, rectangular or square shapes, for example.

In the present invention, the shapes of the openings 45 and the shapes of the openings 25 (shapes of the images 26 of the openings 25) may be the same or different from each other.

Although the electro-optical device of the present invention has been described based on each of the illustrated embodiments, the present invention is not limited thereto, so that the structure of any portion may be replaced with any structure having similar functions.

For example, in the present invention, the structure of two or more of any of the above-described embodiments may be suitably combined.

In the embodiments, although a transmissive liquid crystal panel or a transflective liquid crystal panel is used as a light modulation device, the light modulation device in the present invention is not limited to a liquid crystal panel.

The electro-optical device of the present invention may be an electro-optical device which provides a display of a plurality of colors, such as a full-color electro-optical device, or it may be a monochromatic electro-optical device.

The present invention may be applied to, for example, a projection display device of, for example, a projector; or direct viewing display devices of various electronic apparatuses, such as monitors (displays) of personal computers including a laptop personal computer and a notebook-size personal computer, a television monitor, a television phone monitor, and monitors of portable electronic apparatuses, such as cellular phones (including PHSs), electronic notebooks, electronic dictionaries, electronic cameras (digital cameras), and video cameras, for example.

As mentioned above, according to the present invention, it is possible to focus the light emitted from the light source at the light-transmissive windows with good efficiency, so that the efficiency with which the light emitted from the light source is used can be increased.

In particular, it is possible to realize a backlight display device (direct viewing display device) in which light from the light source is used with very high efficiency.

In the case where the light modulation device is a transflective liquid crystal panel, even when the area of a reflective film (reflective plate) is made to be large, and the area of an opening (light-transmissive window), formed at the reflective film, is made to be small, light from the light source can be efficiently focused at the opening, so that the quantity of light which passes the opening can be increased. Therefore, it is possible to realize a transflective liquid crystal display device having both a high reflection ratio of outside light and a high transmittance ratio of the light from the light source.

In the state where a micro-lens array is not provided, where the pitch between the point light sources is set so that the quantity of light from the plurality of point light sources in the plane that passes through each transmissive window of the light modulation device is substantially uniform, the light quantity difference between pixels (light-transmissive windows) can be made to be small or zero, so that a uniform display can be achieved.

In the case where the electro-optical device is constructed so that light from the point light sources is used to form an image in the plane that passes through each light-transmissive window, and the area of a portion where an image of each point light source and each light-transmissive window overlap does not change to the extent possible even where the image of each point light source and each light-transmissive window are displaced relative to each other, it is possible to make the differences in the light quantities between pixels (light-transmissive windows) small or zero even where the focusing position of the light from each point light source is slightly displaced by, for example, changes with time, thermal expansion, positional displacements, or errors in, for example, the manufacturing process, for example. In other words, it is possible to achieve a uniform display.

Next, several examples of electronic apparatuses to which any one of the above-described electro-optical devices can be applied will be described. FIG. 18 is a perspective view of the structure of a mobile personal computer to which any one of the electro-optical devices can be applied. In FIG. 18, a personal computer 1100 includes a body 1104, including a keyboard 1102, and a display unit 1106, with the display unit 1106 including the electro-optical device 100.

FIG. 19 is a perspective view of the structure of a portable telephone in which the aforementioned electro-optical device 100 can be applied to its display section. In FIG. 19, a portable telephone 1200 includes, in addition to a plurality of operating buttons 1202, an earpiece 1204, a mouthpiece 1206, and the electro-optical device 100.

FIG. 20 is a perspective view of the structure of a digital still camera in which the electro-optical device 100 can be applied to its finder. In FIG. 20, connection with an external device is illustrated in a simple manner. Here, in an ordinary camera, a film is sensitized by an optical image of a subject, whereas, in a digital still camera 1300, an optical image of a subject is subjected to photo-electric conversion by an image-pickup device, such as a CCD (charge coupled device), in order to generate an imaging signal. The electro-optical device 100 is provided at the back of a case 1302 of the digital still camera 1300 and is constructed to perform a display operation based on the imaging signal of the CCD. The electro-optical device 100 functions as a finder to display the subject. A light-receiving unit 1304, including an optical lens and the CCD, are provided at the observation side (the back side in FIG. 20) of the case 1302.

When a photographer checks the subject image displayed on the electro-optical device 100 and presses a shutter button 1306, the imaging signal of the CCD at this point in time is transferred/stored to/in a memory of a circuit substrate 1308. In the digital still camera 1300. at a side surface of the case 1302, a video signal output terminal 1312 and a data communication input/output terminal 1314 are provided. As shown in FIG. 20, when necessary, a television monitor 1430 is connected to the former video signal output terminal 1312, and a personal computer 1440 is connected to the latter data communication input/output terminal 1314. The structure is such that, by a predetermined operation, the imaging signal stored in the memory of the circuit substrate 1308 is output to the television monitor 1430 and the personal computer 1440.

Examples of electronic apparatuses to which the electro-optical device 100 of the present invention can be applied are, in addition to the personal computer shown in FIG. 18, the portable telephone shown in FIG. 19, and the digital still camera shown in FIG. 20, television, a view-finder-type, monitor-direct-viewing-type video tape recorder, a car navigation system, a pager, an electronic notebook, an electronic calculator, a word processor, a work station, a television telephone, a POS terminal, and a device including a touch panel, for example. It goes without saying that the electro-optical device 100 may be used as a display device of these various other electronic apparatuses.

What is claimed is:

1. An electro-optical device comprising:

a plurality of point light sources;

a micro-lens array in which a plurality of micro-lenses are disposed; and a light modulation device including a plurality of light-transmissive windows, the electro-optical device being constructed so that, by the micro-lens array, light from the plurality of point light sources is focused at the light-transmissive windows.

2. The electro-optical device according to claim 1, where a pitch between the point light sources is Ps, a pitch between the light-transmissive windows is Pa, a pitch between the micro-lenses of the micro-lens array is PL, an optical distance between the point light sources and the micro-lens array is Ls, and an optical distance between the micro-lens array and the light-transmissive windows is La, the electro-optical device being constructed so that the following conditional expressions are satisfied:

$$PL=\{Ps \cdot Pa/(Ps+Pa)\} \cdot n \text{ (where } n \text{ is a natural number)}$$

$$La/Ls=Pa/Ps.$$

3. The electro-optical device according to claim 2, the pitch Ps between the point light sources being greater than the pitch Pa between the light-transmissive windows.

4. The electro-optical device according to claim 2, the pitch Ps between the point light sources being equal to the pitch Pa between the light-transmissive windows.

5. The electro-optical device according to claim 1, where a pitch between the point light sources is Ps, a pitch between the light-transmissive windows is Pa, a pitch between the micro-lenses of the micro-lens array is PL, an optical distance between the point light sources and the micro-lens array is Ls, and an optical distance between the micro-lens array and the light-transmissive windows is La, the electro-optical device being constructed so that the following conditional expressions are satisfied:

$$PL=\{Ps \cdot Pa/(Ps+Pa)\} \cdot n \text{ (where } n \text{ is a natural number other than 2)}$$

$$La/Ls=Pa/Ps.$$

6. The electro-optical device according to claim 5, the pitch Ps between the point light sources being greater than the pitch Pa between the light-transmissive windows.

7. The electro-optical device according to claim 5, the pitch Ps between the point light sources being equal to the pitch Pa between the light-transmissive windows.

8. The electro-optical device according to claim 1, the pitch between the point light sources being, in a state where the micro-lens array is not provided, set so that a quantity of the light from the plurality of point light sources in a plane which passes through each light-transmissive window becomes substantially uniform.

9. The electro-optical device according to claim 1, in a state where the micro-lens array is not provided, where a standard deviation in a distribution of a quantity of the light from each point light source in a plane which passes through each light-transmissive window is σ, the pitch between the point light sources being equal to or less than 2.3σ.

10. The electro-optical device according to claim 1, in a state where the micro-lens array is not provided, where a maximum value and a minimum value of a quantity of the light from the plurality of point light sources in a plane which passes through each light-transmissive window are a and b, respectively, the pitch between the point light sources being set so that a light quantity ratio b/a is equal to or greater than 0.9.

11. The electro-optical device according to claim 1, the electro-optical device being constructed so that the light from the point light sources is used to form an image in a plane which passes through each light-transmissive window, and so that an area of a portion where an image of each point light source in the plane and each light-transmissive window overlap does not change to the extent possible even where the image of each point light source and each light-transmissive window are displaced relative to each other.

12. The electro-optical device according to claim 11, the electro-optical device being constructed so that the area of each portion where the image of each point light source in the plane and each light-transmissive window overlap does not change to the extent possible even where the image of each point light source and each light-transmissive window are displaced relative to each other in at least one of a first direction and a second direction perpendicular to the first direction in the plane.

13. The electro-optical device according to claim 11, a shape of each light-transmissive window being at least one of a substantially square shape and a substantially rectangular shape, and a shape of the image of each point light source in the plane being at least one of a substantially square shape and a substantially rectangular shape.

14. The electro-optical device according to claim 13, a predetermined side of each light-transmissive window and a predetermined side of the image of each point light source in the plane being substantially parallel to each other.

15. The electro-optical device according to claim 1, the electro-optical device being constructed so that the light from the point light sources is used to form an image in a plane which passes through each light-transmissive window, and so that an image of each point light source in the plane is included in each light-transmissive window.

16. The electro-optical device according to claim 15, a difference between a length in a first direction of the image of each point light source in the plane and a length in the first direction of each light-transmissive window, and a difference between a length in a second direction, which is perpendicular to the first direction, of the image of each point light source in the plane and a length in the second direction of each light-transmissive window being substantially equal to each other.

17. The electro-optical device according to claim 1, the electro-optical device being constructed so that the light from the point light sources is used to form an image in a plane which passes through each light-transmissive window, and so that each light-transmissive window is included in an image of each point light source in the plane.

18. The electro-optical device according to claim 17, a difference between a length in a first direction of the image of each point light source in the plane and a length in the first direction of each light-transmissive window, and a difference between a length in a second direction, which is perpendicular to the first direction, of the image of each point light source in the plane and a length in the second direction of each light-transmissive window being substantially equal to each other.

19. The electro-optical device according to claim 1, the electro-optical device being constructed so that the light from the point light sources is used to form an image in a plane which passes through each light-transmissive window, and so that a length in a first direction of an image of each point light source in the plane is greater than a length in the first direction of each light-transmissive window, and a length in a second direction, which is perpendicular to the first direction, of the image of each point light source in the plane is less than a length in the second direction of each light-transmissive window.

20. The electro-optical device according to claim 19, a contour of the image of each point light source in the plane including a pair of straight-line portions that are substantially parallel to the first direction.

21. The electro-optical device according to claim 19, a contour of each light-transmissive window including a pair of straight-line portions that are substantially parallel to the second direction.

22. The electro-optical device according to claim 1, the electro-optical device being constructed so that the light from the point light sources is used to form an image in a plane which passes through each light-transmissive window, and so that, in a first direction in the plane, each light-transmissive window is included in an image of each point light source in the plane, and, in a second direction which is perpendicular to the first direction in the plane, the image of each point light source in the plane is included in each light-transmissive window.

23. The electro-optical device according to claim 22, a contour of the image of each point light source in the plane including a pair of straight-line portions that are substantially parallel to the first direction.

24. The electro-optical device according to claim 22, a contour of each light-transmissive window including a pair of straight-line portions that are substantially parallel to the second direction.

25. The electro-optical device according to claim 1, the light modulation device being at least one of a transmissive liquid crystal panel and a transflective liquid crystal panel.

26. The electro-optical device according to claim 1, the light modulation device being a transflective liquid crystal panel.

27. An electronic apparatus, comprising:

the electro-optical device of claim 1.

28. An electro-optical device, comprising:

a plurality of point light sources;

a micro-lens array in which a plurality of micro-lenses are disposed; and a light modulation device including a plurality of light-transmissive windows, the point light sources, the micro-lenses of the micro-lens array, and the light-transmissive windows being disposed so that, by the micro-lens array, light from the plurality of point light sources is focused at the light-transmissive windows.

29. An electro-optical device, comprising:

a plurality of point light sources;

a micro-lens array in which a plurality of micro-lenses are disposed; and a light modulation device including a plurality of light-transmissive windows, the point light sources, the micro-lenses of the micro-lens array, and the light-transmissive windows being disposed so that the micro-lenses of the micro-lens array cause light from the plurality of point light sources to be focused at the plurality of light-transmissive windows.

* * * * *